(12) United States Patent
Wintergerst

(10) Patent No.: US 7,590,803 B2
(45) Date of Patent: Sep. 15, 2009

(54) CACHE EVICTION

(75) Inventor: Michael Wintergerst, Rauenberg (DE)

(73) Assignee: SAP AG, Walldorf (DE)

( * ) Notice: Subject to any disclaimer, the term of this patent is extended or adjusted under 35 U.S.C. 154(b) by 230 days.

(21) Appl. No.: 10/949,541

(22) Filed: Sep. 23, 2004

(65) Prior Publication Data

US 2006/0064549 A1   Mar. 23, 2006

(51) Int. Cl.
G06F 13/00 (2006.01)
G06F 13/28 (2006.01)
G06F 3/00 (2006.01)
G06F 5/00 (2006.01)

(52) U.S. Cl. .................. 711/134; 710/57
(58) Field of Classification Search ........... 711/134; 710/57
See application file for complete search history.

(56) References Cited

U.S. PATENT DOCUMENTS

| | | | |
|---|---|---|---|
| 5,034,885 A | 7/1991 | Matoba et al. | |
| 5,331,318 A | 7/1994 | Montgomery | |
| 5,566,315 A * | 10/1996 | Mililo et al. | 711/113 |
| 5,594,886 A | 1/1997 | Smith et al. | |
| 5,636,355 A | 6/1997 | Ramakrishnan et al. | |
| 5,692,193 A | 11/1997 | Jagannathan et al. | |
| 5,710,909 A * | 1/1998 | Brown et al. | 711/170 |
| 5,778,430 A | 7/1998 | Ish et al. | |
| 5,781,924 A | 7/1998 | Zaitzeva et al. | |
| 5,809,527 A | 9/1998 | Cooper et al. | |
| 5,822,759 A | 10/1998 | Treynor | |
| 5,926,834 A * | 7/1999 | Carlson et al. | 711/152 |
| 5,933,848 A | 8/1999 | Moenne-Loccoz | |
| 5,944,781 A | 8/1999 | Murray | |
| 6,038,571 A * | 3/2000 | Numajiri et al. | 707/206 |
| 6,065,006 A | 5/2000 | deCarmo et al. | |
| 6,075,938 A | 6/2000 | Bugnion et al. | |
| 6,092,171 A * | 7/2000 | Relph | 711/203 |
| 6,141,728 A | 10/2000 | Simionescu et al. | |

(Continued)

FOREIGN PATENT DOCUMENTS

EP   1380941   1/2004

(Continued)

OTHER PUBLICATIONS

Handy, Jim, "The Cache Memory Book", 1998, Academic Press Inc, 2nd edition, pp. 60.*

(Continued)

*Primary Examiner*—Pierre-Michel Bataille
*Assistant Examiner*—Edward J Dudek
(74) *Attorney, Agent, or Firm*—Blakely, Sokoloff, Taylor & Zafman LLP

(57) ABSTRACT

Described herein are methods and apparatus, including computer program products, that implement cache eviction for runtime systems. A computer program product can cause a data processing apparatus to compute a fill level of a cache memory; use a first eviction process to evict one or more of the entities in the cache memory if the fill level exceeds a first threshold but not a second threshold; use a second, distinct eviction process to evict one or more of the entities in the cache memory if the fill level exceeds the second threshold but not a third threshold; and decline subsequent requests to store additional entities in the cache memory if the fill level exceeds the third threshold.

24 Claims, 9 Drawing Sheets

U.S. PATENT DOCUMENTS

| | | |
|---|---|---|
| 6,199,179 B1 | 3/2001 | Kauffman et al. |
| 6,216,212 B1 | 4/2001 | Challenger et al. |
| 6,223,256 B1 | 4/2001 | Gaither |
| 6,256,712 B1 | 7/2001 | Challenger et al. |
| 6,272,598 B1 | 8/2001 | Arlitt et al. |
| 6,295,582 B1 | 9/2001 | Spencer |
| 6,356,529 B1 | 3/2002 | Zarom |
| 6,356,946 B1 | 3/2002 | Clegg et al. |
| 6,389,509 B1 | 5/2002 | Berenguel et al. |
| 6,412,045 B1 | 6/2002 | DeKoning et al. |
| 6,425,057 B1 | 7/2002 | Cherkasova et al. |
| 6,438,654 B1 | 8/2002 | Elko et al. |
| 6,446,088 B1 | 9/2002 | Vaduvur et al. |
| 6,519,594 B1 | 2/2003 | Li |
| 6,587,937 B1 | 7/2003 | Jensen et al. |
| 6,591,347 B2 | 7/2003 | Tischler et al. |
| 6,601,143 B1 | 7/2003 | Lamparter |
| 6,622,186 B1 | 9/2003 | Moniot et al. |
| 6,651,080 B1 | 11/2003 | Liang et al. |
| 6,732,237 B1 | 5/2004 | Jacobs et al. |
| 6,738,977 B1 | 5/2004 | Berry et al. |
| 6,748,487 B1 | 6/2004 | Takamoto et al. |
| 6,754,662 B1 | 6/2004 | Li |
| 6,757,708 B1 | 6/2004 | Craig et al. |
| 6,766,419 B1 | 7/2004 | Zahir et al. |
| 6,829,679 B2 | 12/2004 | DeSota et al. |
| 6,944,711 B2 | 9/2005 | Mogi et al. |
| 6,970,925 B1 | 11/2005 | Springmeyer et al. |
| 6,976,090 B2 | 12/2005 | Ben-Shaul et al. |
| 6,990,534 B2 | 1/2006 | Mikhailov et al. |
| 6,996,679 B2 | 2/2006 | Cargnoni et al. |
| 7,024,512 B1* | 4/2006 | Franaszek et al. ............ 711/100 |
| 7,051,161 B2 | 5/2006 | Dixit et al. |
| 7,069,271 B1 | 6/2006 | Fadel et al. |
| 7,096,319 B2 | 8/2006 | Mogi et al. |
| 7,096,418 B1 | 8/2006 | Singhal et al. |
| 7,191,170 B2 | 3/2007 | Ganguly et al. |
| 7,296,267 B2 | 11/2007 | Cota-Robles et al. |
| 7,305,495 B2 | 12/2007 | Carter |
| 7,437,516 B2* | 10/2008 | Wintergerst et al. ......... 711/135 |
| 7,451,275 B2* | 11/2008 | Petev et al. ................. 711/135 |
| 7,512,737 B2* | 3/2009 | Petev et al. ................. 711/121 |
| 2002/0046325 A1 | 4/2002 | Cai et al. |
| 2002/0052914 A1 | 5/2002 | Zalewski et al. |
| 2002/0073283 A1 | 6/2002 | Lewis et al. |
| 2002/0093487 A1 | 7/2002 | Rosenberg |
| 2002/0099691 A1 | 7/2002 | Lore et al. |
| 2002/0099753 A1 | 7/2002 | Hardin et al. |
| 2002/0147888 A1 | 10/2002 | Trevathan |
| 2002/0156863 A1 | 10/2002 | Peng |
| 2002/0169926 A1 | 11/2002 | Pinckney et al. |
| 2002/0198953 A1 | 12/2002 | O'Rourke et al. |
| 2003/0014521 A1 | 1/2003 | Elson et al. |
| 2003/0023827 A1 | 1/2003 | Palanca et al. |
| 2003/0037148 A1 | 2/2003 | Pedersen |
| 2003/0070047 A1 | 4/2003 | Dwyer et al. |
| 2003/0074525 A1 | 4/2003 | Yamauchi et al. |
| 2003/0084248 A1 | 5/2003 | Gaither et al. |
| 2003/0084251 A1 | 5/2003 | Gaither et al. |
| 2003/0093487 A1* | 5/2003 | Czajkowski et al. ........ 709/213 |
| 2003/0097360 A1 | 5/2003 | McGuire et al. |
| 2003/0131010 A1 | 7/2003 | Redpath |
| 2003/0177382 A1 | 9/2003 | Ofek et al. |
| 2003/0212654 A1 | 11/2003 | Harper et al. |
| 2003/0229760 A1 | 12/2003 | Doyle et al. |
| 2003/0236857 A1 | 12/2003 | Takase et al. |
| 2004/0024971 A1* | 2/2004 | Bogin et al. ................. 711/135 |
| 2004/0054860 A1 | 3/2004 | Dixit et al. |
| 2004/0088412 A1 | 5/2004 | John et al. |
| 2004/0117441 A1* | 6/2004 | Liu et al. .................... 709/203 |
| 2004/0168029 A1 | 8/2004 | Civlin |
| 2004/0168031 A1 | 8/2004 | Haskins |
| 2004/0205299 A1 | 10/2004 | Bearden |
| 2004/0215883 A1 | 10/2004 | Bamford et al. |
| 2005/0021917 A1 | 1/2005 | Mathur et al. |
| 2005/0027943 A1 | 2/2005 | Steere et al. |
| 2005/0071459 A1 | 3/2005 | Costa-Requena et al. |
| 2005/0086656 A1 | 4/2005 | Whitlock et al. |
| 2005/0086662 A1 | 4/2005 | Monnie et al. |
| 2005/0091388 A1 | 4/2005 | Kamboh et al. |
| 2005/0125503 A1 | 6/2005 | Iyengar et al. |
| 2005/0125607 A1 | 6/2005 | Chefalas et al. |
| 2005/0131962 A1 | 6/2005 | Deshpande |
| 2005/0138193 A1 | 6/2005 | Encarnacion et al. |
| 2005/0154837 A1 | 7/2005 | Keohane et al. |
| 2005/0180429 A1 | 8/2005 | Ghahremani et al. |
| 2005/0198199 A1 | 9/2005 | Dowling |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2006/0064545 A1 | 3/2006 | Wintergerst |
| 2006/0069712 A1 | 3/2006 | Anders et al. |
| 2006/0070051 A1 | 3/2006 | Kuck et al. |
| 2006/0092165 A1 | 5/2006 | Abdalla et al. |
| 2006/0136667 A1 | 6/2006 | Shultz et al. |
| 2006/0143256 A1* | 6/2006 | Galchev et al. ............. 707/206 |
| 2006/0143389 A1 | 6/2006 | Kilian et al. |
| 2006/0143392 A1* | 6/2006 | Petev et al. ................. 711/133 |
| 2006/0143393 A1* | 6/2006 | Petev et al. ................. 711/133 |
| 2006/0143399 A1* | 6/2006 | Petev et al. ................. 711/136 |
| 2006/0143427 A1 | 6/2006 | Marwinski et al. |
| 2006/0206856 A1 | 9/2006 | Breeden et al. |
| 2006/0248131 A1 | 11/2006 | Marwinski et al. |
| 2006/0248284 A1 | 11/2006 | Petev |
| 2006/0294253 A1 | 12/2006 | Linderman |

FOREIGN PATENT DOCUMENTS

| | | |
|---|---|---|
| GB | 2 276 962 | 10/1994 |
| WO | WO/0023898 | 4/2000 |

OTHER PUBLICATIONS

Hennessy, John; Patterson, David, "Computer Organization and Design", 1998, Morgan Kaufmann Publishers Inc, 2nd edition, pp. 575-576.*
Stark, Ian; Longley, John, "CS2 Advanced Programming in Java note 9", 2002, pp. 1-5.*
Dagfinn Parnas "SAP Virtual Machine Container", https://weblogs.sdn.sap.com/pub/wlg/940 , Posted on Oct. 23, 2004, pp. 1-4.
Norbert Kuck, et al., "SAP VM Container: Using Process Attachable Virtual machines to Provide Isolation and Scalability For Large Servers", *Article*, SAP AG, Walldorf, Germany , 2002 pp. 1-2.
Renee Boucher Ferguson, "SAP Preps New NetWeaver Capabilities", eWeek.com, http://www.eweek.com/article2/0,1759,1668146,00.asp, Oct. 7, 2007, pp. 1-6.
SAP NetWever Makes Standard Java Robust http://www.sap.com/company/press/press.epx?pageview=print&pressid=3069 , Oct. 5, 2004, pp. 1-2.
"SAP Beefs Up Java Support Capabilities For New NetWeaver", News Story, Oct. 11, 2004, (Computerworld). http:www.computerworld.com/printthis/2004/0,4814,96558,00.html, pp. 1-2.
"SAP Presents New Capabilities for Netweaver", InfoWorld, Oct. 6, 2004 pp. 1-5, http://www.infoworld.com/article/04/10/06/HNsapnetweaver_1.html.
"Load Balancing of the SAP Web As for Java Applications", SAP Library, http://help.sap.com/saphelp.nw04/helpdata/en/b5/e8239ef7bd494f896a84625d4b688f/cont. 2 pages, Nov. 2004.
"Failover System", SAP Library, Nov. 2004,http://help.sap.com/saphelp_nw04/helpdata/en/d7/57af0cce55143be5de3a6e4911186.cont, 2 pages.
"Http Sessions and Failover of Web Application", SAP Library, Nov. 2004, 1 page. http://help.sap.com/saphelp_nw04/helpdata/en/90/044cc585eaba42b649f16181b0fdf/cont.

WebLogic RMI Features and Guidelines, eDocs, pp. 1-7, Nov. 2004, http://e-docs.bea.com/wls/docs90/rmi/rmi_api.html.

"Java Technology in SAP Web Application Server", SAP Library, http://help.sap.com/saphelp_nw04/helpdata/en/0d/a3bbeff62847ae10000000a114084/cont Nov. 2004, pp. 1-3.

"High Availability and Failover", SAP Library, http://help.sap.com/saphelp_nw04/helpdata/en/6c/209da105668c45be12f1d9cc412e2b/cont Nov. 2004, pp. 1-2.

"Failover for Enterprise Beans", SAP Library, http://help.sap.com/saphelp_nw04/helpdata/en/8f/d6e45953a494499ea1b79ab16321d2/cont Nov. 2004, pp. 1-3.

"Failover for Clustered RMI-P4 Remote Objects", SAP Library, http://help.sap.com/saphelp_nw04/helpdata/en/f6/4ef11ab3a52f408aa8a133f33d6cf1/cont Nov. 2004, pp. 1-3.

Grzegorz Czajkowski, "Multitasking without Compromise: a Virtual Machine Evolution", *Paper*, Sun Microsystems Laboratories, 2001, pp. 1-14.

Mick Jordan, et al. "Scaling J2EE Application Servers with the Multi-Tasking Virtual Machine", *Paper*, Sun Microsystems, SMLI TR-2004-135, Jun. 2004, pp. 1-19.

Mick Jordan, et al, "Extending a J2EE Server with Dynamic and Flexible Resource Management", *Paper*, Sun Microsystems, Inc, and School of Computer Science, University of Waterloo, Waterloo, ON, Canada, Oct. 2004, 20 pages.

Grzegorz Czajkowski, et al., "A Multi-User Virtual Machine", *Paper*, Sun Microsystems Laboratories and S₃ Lab, Purdue University, West Lafayette, IN, 2003, 14 pages.

Sudhir Movva & Murali Vallath, "Transparent Clustered Database Failover Using JAVA", http://www.quest-pipelines.com/newsletter-v5/0604_A.htm, Apr. 2004, 11 pages.

Ciaran Bryce, LogOn Technology Transfer, Kronerg, Germany, Experts' Corner: "Isolates: A New Approach to Multi-Programming in Java Platforms", May 2004, *Article*, 7 pages.

Patrick Tullmann, et al., "Janos: A Java-oriented OS for Active Network Nodes", *Paper*, Flux Research Group, University of Utah, Mar. 2001, 14 pages.

Patrick Doyle, et al., A Modular and Extensible JVM Infrastructure, *Paper*, Edward S. Rogers Sr. Department of Electrical and Computer Engineering, University of Toronto, Toronto, Ontario, Canada, 14 pages. Jul. 2002.

Sandhya Dwarkadas, et al., "Cashmere-VLM: Remote Memory Paging for Software Distributed Shared Memory", *Paper*, Compaq Cambridge Research Lab, Cambridge, MA and Department of Computer Science, University of Rochester, Rochester, NY, 7 pages, Apr. 1999.

Alex Gontmakher, et al. "Characterizations for Java Memory Behavior", *Paper*, Computer Science Department, Technion, 5 pages, 1997.

"System and Method for Shared Memory/File System Java ObjectGroup Clustered JVM", http://www.priorartdatabase.com/IPCOM/000021597/, Published Jan. 2004, 3 pages.

Marcelo Loosco, et al., "A New Distributed Java Virtual Machine for Cluster Computing", Notes in Computer Science, Springer-Verlag, v. 2790, p. 1207-1215, 2003.

D. Dillenbeger, et al., "Building a Java Virtual Machine For Server Applications: The Jvm On Os/390", IBM Systems Journal, vol. 39, No. 1, 2000, pp. 194-210.

Robert Davies, "Data Caching: A Prerequisite to the Enterprise Service Bus", Business Integration Journal, Oct. 2003, pp. 41-44.

"Caching with IBM WebSphereMQ", spiritcache, Use Case & Code Example, article, Nov. 19, 2004, pp. 1-9.

"Using Rules-based Object Caching: Allocating dataresources for best service levels to profitable customers", spiritcache, White paper, Nov. 2004, pp. 1-8.

"Introducing Cache-Forward Architecture", ObjectStore, paper, Jan. 1, 2004, pp. 1-23.

Jerry Bortvedt, "Functional Specification for Object Caching Service for Java (OCS4J), 2.0", Paper, Aug. 9, 2000, pp. 1-27.

http://homepage.mac.com/vineetb/iblog/C684524823/, "Java VineetB-log.java", Dec. 18, 2003, 1 page.

http://db.apache.org/torque-32/managers-cache.html, "Managers—Into", Apr. 11, 2002 pp. 1-4.

http://java-source.net/open-source/cache-solutions, "Open Source Cache Solutions in Java", Nov. 2004, pp. 1-3.

Thomas Conte, http://www.pas.net/tom/articles/oscache/en/, "Implementing OSCache", Jun. 2002, pp. 1-4.

Greg Luck, http://www.theserverside.com/news, "Ehcache 1.0 released", Oct. 9, 2004, pp. 1-5.

Srini Penchikala, http://www.onjava.com/pub/a/onjava/2003/caching.html, "Object Caching in a Web Portal Application Using JCS", Dec. 23, 2003, pp. 1-18.

http://jakarta.apache.org/jcs/Plugins.html, "JCS Plugin Overview", Jul. 2004, 2 pages.

http://www.mail-archive.com/turbine-jcs-dev@jakarta.apache.org/msg00647.html, turbine-jcs-dev, Jul. 13, 2004, pp. 1-3.

Srini Penchikala, http://www.javaworld.com/javaworld/jw-05-2004/jw-0531-cache_p.html, J2EE Object-Caching Frameworks, May 31, 2004.

http://.jcp.org/en/jsr/detail?id=107, JSR 107: JCache-Java Temporary Caching API, Mar. 20, 2001, 5 pages.

http://www.opensymphony.com/oscache, "OSCache", Nov. 2004, 1 page.

Andres March, http://www.opensymphony.com/oscache/wiki/Change%20Log.html, OSCache: Change Log, Jan. 18, 2004, pp. 1-11.

http://www.jdocs.com/osche/2.0.2/api/com/opensymphony/oscache/base/AbstractCache.html, "Class AbstractCacheAdministrator" Jan. 2004, pp. 1-11.

http://www.jdocs.com/osche/2.0.2/api/com/opensymphony/oscache/base/Cache.html, "Class Cache" Jan. 2004, pp. 1-16.

http://www.jdocs.com/osche/2.0.2/api/com/opensymphony/oscache/base/CacheEntry.html, "Class CacheEntry" Jan. 2004, pp. 1-8.

http://www.jdocs.com/osche/2.0.2/api/com/opensymphony/oscache/base/Config.html, "Class Config" Jan. 2004, pp. 1-4.

http://www.jdocs.com/osche/2.0.2/api/com/opensymphony/oscache/base/overview-sum.html, "OSCache, V 2.0.2 API Specification" Jan. 2004, 2 pages.

http://www.jdocs.com/osche/2.0.2/api/com/opensymphony/oscache/base/overview-frame.html, "OSCache 2.0.2" Jan. 2004, 1 page.

http://www.jdocs.com/osche/2.0.2/api/com/opensymphony/oscache/base/allclases-frame.html, "All Classes" Jan. 2004, 1 page.

http://www.spirit-soft.com/index.do?id=30, "spiritcache", Nov. 2004, 1 pages.

Floyd Marinescu, http://www.theserverside.com/news/thread.tss?thread_id=18483, "SpiritSoft Announces Availability of SpiritCache 2.0", Mar. 21, 2003, pp. 1-5.

Stark 2002/Langley 2004, Concurrent Programming In Java, CS2 Advanced Programming in Java note 9, S2Bh, Jan. 3, 2002 pp. 1-5.

Thomas Smits Unbreakable Java, The Java Server that Never Goes Down, Nov. 2004, pp. 1-5.

*White Paper: 'Using Rules-based Object Caching', spiritsoft /spiritcache 4.0 2004*, (2004), 8.

"All Classes, Packages", http://www.jdocs.com/osche/2.0.2/api/overview-frame.html, *OSCache 2.0.2*, (Jan. 2004), 1.

"JCS Plugin Overview", http://jakarta.apache.org/jcs/Plugins.html, (Jul. 2004), 2.

"Shared disk I/O cache", *IP.com Journal, IP.com Inc.*, West Henrietta, XP013014199 ISSN: 1533-0001, (Jan. 29, 2004),6.

Jagannathan, "High-Level Abstraction for Efficient Concurrent Systems", *NEC Research Institute, Section 5.2*, (Mar. 1994), 20.

Penchikala, Srini, "Object Caching In A Web Portal Application Using JCS", http://www.onjava.com/pub/a/onjava/2003/12/23/caching.html, (Dec. 23, 2003), 18.

Pawlan, Monica—Reference Objects and Garbage Collection—Aug. 1998, sun Microsystems, pp. 8 and 15-16.

Petev, Petio G., et al., "Least Recently Used Eviction Implementation", U.S. Appl. No. 11/024,524, filed Dec. 28, 2004—*Non-Final Office Action Mailed Oct. 22, 2007 with Claims as they currently stand.*, pp. 1-12 and pp. 1-7.

Petev, Petio G., et al., "Least Recently Used Eviction Implementation", U.S. Appl. No. 11/024,524, filed Dec. 28, 2004—*Non-Final Office Action Mailed Jun. 15, 2007*.

Galchev, Galin, et al., "Plug-In Based Caching Architecture Capable Of Implementing Multiple Cache Regions Per Applications", U.S.

Appl. No. 11/024,554, filed Dec. 28, 2004—*Final Office Action mailed Oct. 29, 2007 with claims as they currently stand.*, pp. 1-7 and pp. 1-6.

Galchev, Galin, et al., "Plug-In Based Caching Architecture Capable Of Implementing Multiple Cache Regions Per Applications", U.S. Appl. No. 11/024,554, filed Dec. 28, 2004—*Final Office Action mailed Apr. 26, 2007.*

Wintergerst, Michael, et al., "Programming Models For Eviction Policies", U.S. Appl. No. 11/025,178, filed Dec. 28, 2004—*Final Office Action mailed Feb. 20, 2008 with claims as they currently stand.*, pp. 1-8 and 1-8.

Wintergerst, Michael, et al., "Programming Models For Eviction Policies", U.S. Appl. No. 11/025,178, filed Dec. 28, 2004—*Office Action mailed Aug. 10, 2007.*

Petev, Petio G., et al., "Sized Based Eviction Implementation", U.S. Appl. No. 11/024,591, filed Dec. 28, 2004—*Final Office Action mailed Mar. 11, 2008 with claims as they currently stand.*, pp. 1-15 and pp. 1-8.

Petev, Petio G., et al., "Sized Based Eviction Implementation", U.S. Appl. No. 11/024,591, filed Dec. 28, 2004—*Final Office Action mailed Oct. 10, 2007.*

Petev, Petio G., et al., "First In First Out Eviction Implementation", U.S. Appl. No. 11/024,546, filed Dec. 28, 2004—*Final Office Action mailed Oct. 3, 2007 with claims as they currently stand.*, pp. 1-13 and pp. 1-8.

Petev, Petio G., et al., "First in First Out Eviction Implementation", U.S. Appl. No. 11/024,546, filed Dec. 28, 2004, *the Office Action mailed Apr. 6, 2007.*

Petev, Petio G., et al., "Least Frequently Used Eviction Implementation", U.S. Appl. No. 11/024,565, filed Dec. 28, 2004, *Non-Final Office Action mailed Oct. 25, 2007 with claims as they currently stand.*, pp. 1-14 and pp. 9-15.

Petev, Petio G., et al., "Least Frequently Used Eviction Implementation", U.S. Appl. No. 11/024,565, filed Dec. 28, 2004, *Final Office Action mailed Jun. 12, 2007.*

""SAP Web Application Server Security Guide"", *Version 1.00*, (Apr. 29, 2004), pp. 79-81, 89.

"FOA Mailed Aug. 17, 2007 for U. S. Appl. No. 11/013,277", (Aug. 17, 2007), Whole Document.

"OA Mailed Jan. 7, 2008 for U.S. Appl. No. 11/013,277", (Jan. 7, 2008), Whole Document.

"OA Mailed Mar. 12, 2007 for U.S. Appl. No. 11/013,277", (Mar. 12, 2007), Whole Document.

"FOA Mailed Aug. 17, 2007 for U.S. Appl. No. 11/013,278", (Aug. 17, 2007), Whole Document.

"OA Mailed Feb. 5, 2008 for U.S. Appl. No. 11/013,278", (Feb. 5, 2008), Whole Document.

"OA Mailed Mar. 16, 2007 for U.S. Appl. No. 11/013,278", (Mar. 16, 2007), Whole Document.

"FOA Mailed Aug. 28, 2007 for U.S. Appl. No. 11/012,803", (Aug. 28, 2007), Whole Document.

"OA Mailed Jan. 24, 2008 for U.S. Appl. No. 11/012,803", (Jan. 24, 2008), Whole Document.

"OA Mailed Mar. 16, 2007 for U.S. Appl. No. 11/012,803", (Mar. 16, 2007), Whole Document.

Barrett, Ryan, "P4 Protocol Specification", (Sep. 2001), 1-12.

Cheng, Kai, et al., "LRU-SP: A size-adjusted and popularity-aware LRU replacement algorithm for web caching", Kai Cheng and Yahiko Kambayashi; "*LRU SP: A size-adjusted and popularity-aware LRU replacement algorithm for web caching*"; Oct. 2000; IEEE; pp. 48-53, (Oct. 2000), 48-53.

European Search Report, "Common Cache Management in a Plurality of Virtual Machines", European Patent Application No. 05028446.2-2201, European Search Report dated Dec. 4, 2007, mailed Dec. 20, 2007, 7 pgs.

Galchev, Galin, "Plug-in Based Caching Architecture Capable of Implementing Multiple Cache Regions Per Application", U.S. Appl. 11/024,554, filed Dec. 28, 2004—*Non-Final Office Action mailed May 28, 2008*, 7 pgs.

JSR 107: JCache, "JSR 107: JCache", *Java Temporary Caching API*, Website, http://web1.jcp.org/en;jsr/detail?id=107, (Nov. 28, 2004), 4.

Karedla, Ramakrishna, et al., "Caching strategies to improve disk system performance", Ramakrishna Karedla, J. Spencer Love, and Bradley G. Wherry; "*Caching strategies to improve disk system performance*"; Mar. 1993; vol. 27; Issue 3; IEEE: pp. 38-46, (Mar. 1993), 38-46.

Kilian, Frank, et al., "Common Cache Management in a Plurality of Virtual Machines", U.S. Appl. No. 11/025,482, filed Dec. 28, 2004—*Non-Final Office Action mailed Apr. 17, 2008*, 15 pgs.

Kilian, Frank, et al., "Common Cache Management in a Plurality of Virtual Machines", U.S. Appl. No. 11/025,482, filed Dec. 28, 2004—*Non-Final Office Action mailed Feb. 27, 2007*, 15 pgs.

Kilian, Frank, et al., "Common Cache Management in a Plurality of Virtual Machines", U.S. Appl. No. 11/025,482, filed Dec. 28, 2004—*Final Office Action mailed Aug. 10, 2007*, 17 pgs.

Luik, Oliver, "System and Method for a Pluggable Protocol Handler", U.S. Appl. No. 11/185,199, filed Jul. 19, 2005—*Final Office Action mailed Mar. 18, 2008*, 13 pgs.

Oracle, *Oracle Application Server 10g Release 2* (10.1.2), Nov. 2004.

Petev, Petio G., "Central Cache Configuration", U.S. Appl. No. 11/117,876, filed Apr. 29, 2005—*Non-Final Office Action mailed Oct. 30, 2007*, 18 pgs.

Petev, Petio G.; "First in First Out Eviction Implementation", U.S. Appl. No. 11/024,546, filed Dec. 28, 2004—*Non-Final Office Action mailed Mar. 17, 2008*, 16 pgs.

Petev, Petio, et al., "Least frequently used eviction implementation", U.S. Appl. No. 11/024,565, filed Dec. 28, 2004—*Non-Final Office Action mailed Jun. 19, 2008*, 20.

Petev, Petio G., "Programming Models for Storage Plug-ins", U.S. Appl. No. 11/024,651, filed Dec. 28, 2004—*Non-Final Office Action mailed Mar. 14, 2008*, 11 pgs.

Petev, Petio G., "Size Based Eviction Implementation", U.S. Appl. No. 11/024,591, filed Dec. 28, 2004—*Non-Final Office Action dated Mar. 11, 2008*, 13 pgs.

Salo, Timo, et al., "Object Persistence Beyond Serialization", *Increasing Productivity and Reducing Maintenance, Dr. Dobb's Journal*, M7T Publ., vol. 24, No. 5, XP000925486. ISSN: 1044-789X. (May 1999), 5.

Salo, Timo, et al., "Persistence in Enterprise JavaBeans Applications", *Joop*, XP002142904., (Jul. 1999), 3.

SAP, "Shared Disk I/O Cache", *No author name supplied in source data: I.P.Com Journal, IP.Com, Inc.*, West Henrietta, NY, US, Jan. 29, 2004, XP013014199, 6 pages.

Smits, Thomas, "Unbreakable Java—The Java Server that Never Goes Down", *Article, SAP TechED*, Nov. 2004, San Diego and Munich, (Nov. 2004), 1-5.

Srinivasan, V., et al., "Object Persistence in Object-Oriented Applications", *IBMSystems Journal, IBM Corp.*, vol. 36, No. 1, 1997, pp. 11, XP000685709, ISSN: 0018-8670., (1997).

Tatarinov, Igor, et al., "Static Caching in Web Servers", Igor Tatarinov, Alex Rousskov, Valery Soloviev; "*Static Caching in Web Servers*"; 1997; IEEE; pp. 410-417, (1997), 410-417.

Veldema, et al., *Runtime Optimizations for Java DSM Implementation. Proceedings of the 2001 joint ACM-ISCOPE conference on Java Grande* [online]*2001*, http://delivery.acm.org/10.1145/380000/376842/p153-veldema.pdf?key1=376842&key2=2893403811&coll=GUIDE&dl=GUIDE&CFID=26913973&CFTOKEN=12550, (2001).

Wond, Wayne A., et al., "Modified LRU Policies for Improving Second-lever Cache Behavior", Wayne A. Wong and Jean-Loup Baer; "*Modified LRU Policies for Improving Second-lever Cache Behavior*"; Jan. 2000; Department of Computer Science and Engineering University of Washington; pp. 49-60, (Jan. 2000), 49-60.

Notice of Allowance mailed Jul. 28, 2008 for U.S. Appl. No. 11/024,651.

Office Action mailed May 28, 2008 for U.S. Appl. No. 11/024,554.

Notice of Allowance mailed Jun. 9, 2008 for U.S. Appl. No. 11/025,178.

Notice of Allowance mailed Aug. 21, 2008 for U.S. Appl. No. 11/024,591.

Office Action mailed Mar. 17, 2008 for U.S. Appl. No. 11/024,546.

Office Action mailed Mar. 11, 2008 for U.S. Appl. No. 11/025,591, pp. 15., 15.

Office Action mailed Mar. 17, 2008 for U.S. Appl. No. 11/024,565, pp. 18., 18.

Office Action mailed Jun. 19, 2008 for U.S. Appl. No. 11/024,565, pp. 22., 22.

Non-Final Office Action mailed Oct. 6, 2008 for U.S. Appl. No. 11/119,08.

Non-Final Office Action for U.S. Appl. No. 11/024,524 Mailed Nov. 12, 2008, 31 pages.

Final Office Action for U.S. Appl. No. 11/024,554 Mailed Nov. 26, 2008, 15 pages.

Final Office Action for U.S. Appl. No. 11/117,876, Mailed Jan. 27, 2009, 18 pages.

Notice of Allowance for U.S. Appl. No. 11/024,565, Mailed Jan. 28, 2009, 9 pages.

Luik, Oliver, *Non-Final Office Action dated Sep. 11, 2008*, U.S. Appl. No. 11/185,199, filed Jul. 19, 2005, 17 pgs.

Marwinski, Dirk, *Non-Final Office Action dated Oct. 6, 2008*, U.S. Appl. No. 11/119,084, filed Apr. 29, 2005, 10 pgs.

Tanenbaum, Andrew S., "Structured Computer Organization", Prentice-Hall, Inc., 2nd Edition, (1984), 10-12.

USPTO, "OA Mailed Oct. 29, 2008 for U.S. Appl. No. 11/025,482", (Oct. 29, 2008), Whole Document.

Wang, Ben, "Enter the JBoss Matrix", *JBossCache 1.0 Released* [*online*] [*retrieved on Oct. 24, 2008*] Retrieved from the Internet<URL:http://blogs.jboss.com/blog/nfleury/2004/03/25/JBossCache+1.0+Released.html>, (Mar. 25, 2004).

* cited by examiner

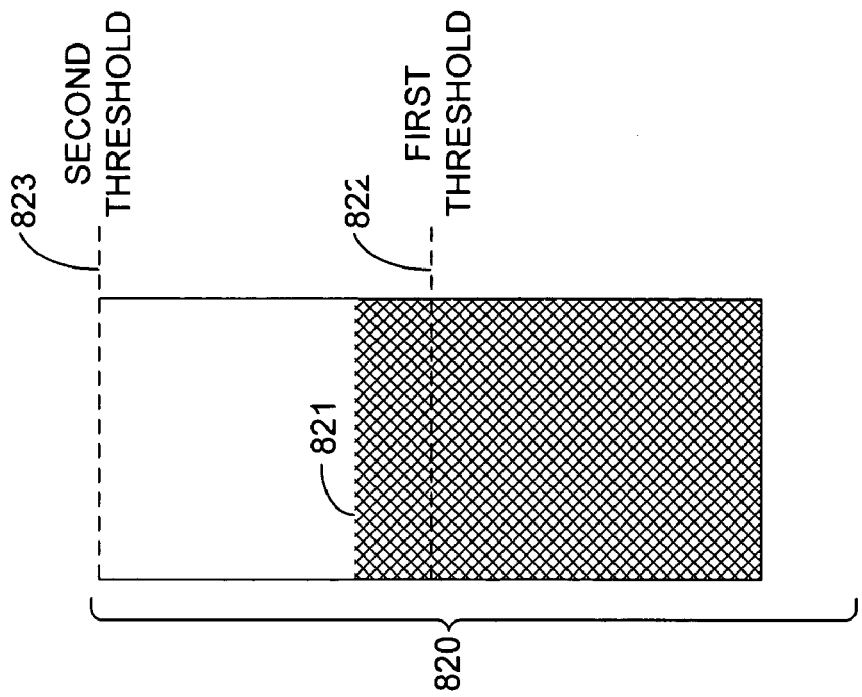
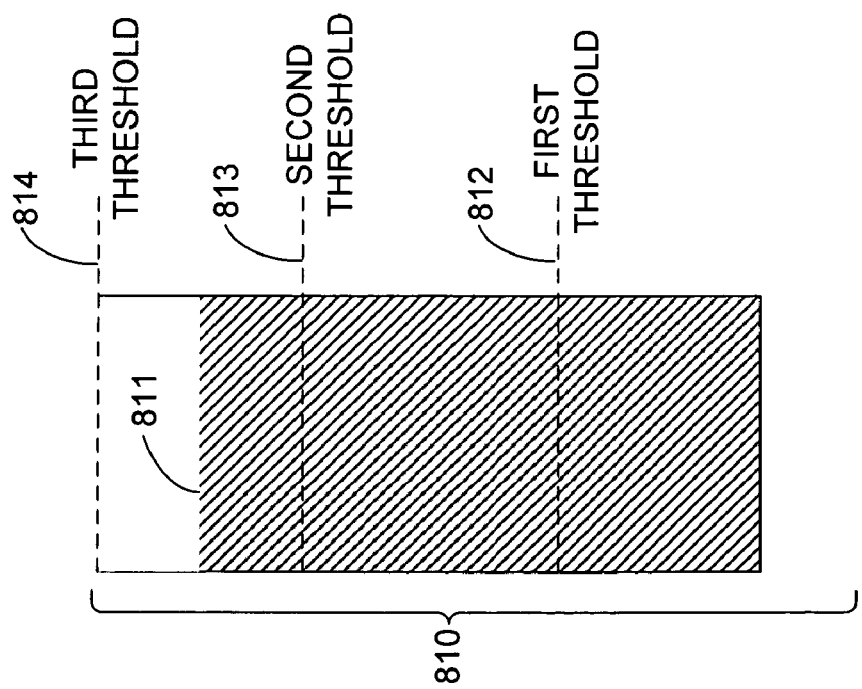
FIG. 8

CACHE EVICTION

BACKGROUND

The present application relates to digital data processing, and more particularly to cache eviction for runtime systems.

A runtime system is a code execution environment that executes instructions or code in user requests and that provides runtime services for that code. Core runtime services can include functionality such as process, thread, and memory management (e.g., laying out entities in a server memory, managing references to entities, and garbage collecting entities). Enhanced runtime services can include functionality such as error handling and establishing security and connectivity.

One example of a runtime system is a virtual machine (VM). A VM is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulate the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The CLR is a managed code execution environment developed by Microsoft Corp. of Redmond, Wash.

When executing, runtime systems create and reference local data entities. Many different types of local entities can be created, including, for example, strings, constants, and variables, objects that are instances of a class, runtime representations of a class, and class loaders that are used to load class runtime representations.

When a local entity is no longer being used by a runtime system, the memory being used to store the local entity needs to be reclaimed—i.e., freed or otherwise released and returned to the pool of available memory—so that it can be used to store new data entities. In some environments, programmers must explicitly reclaim the memory they have allocated for local entities (e.g., by explicitly calling functions to free specified sections of memory). In other environments, the reclamation of memory is handled through a technique known as garbage collection.

Garbage collection is a process designed to identify and reclaim blocks of memory that have been dispensed by a memory allocator but that are no longer "live" (i.e., no longer being used, as determined, for example, by not being reachable from any currently referenced objects or entities). Entities that are garbage collected are typically referred to as being "dead" as opposed to being live. Garbage collection is usually handled as a background task by runtime systems rather than as an explicit task by user programs. There are some costs associated with garbage collection, as access to memory must typically be restricted and runtime systems must sometimes be halted during some portions of the garbage collection process.

Multiple runtime systems can be executed in parallel in order to increase the performance and scalability of server environments. When multiple runtime systems are executed in parallel, resource (e.g., memory) and time consumption can be reduced by sharing entities between the runtime systems. There are multiple techniques that can be used to share entities, and many different types of entities can be shared (including for example strings, constants, variables, object instances, class runtime representations, and class loaders).

A runtime system can include a cache, which is a temporary storage, in a memory, for entities. In some implementations, entities in a cache can be directly accessed by programs running in the runtime system. For example, a program can store and retrieve entities in the cache. In a cache for a Java VM, objects can be cached in the local heap.

To regulate the amount of entities in a cache, a cache can implement techniques and/or mechanisms to evict cached entities. When cached entities are evicted, runtime systems that can access the cache might not be notified of the eviction and the entity that was cached cannot be retrieved by the runtime systems. Eviction policies are used to evict entities in a cache as they provide guidance as to which cached entities should be evicted. Eviction policies can include, as examples, random eviction, round-robin eviction, and least recently used eviction.

SUMMARY

Described herein are methods and apparatus, including computer program products, that implement cache eviction for runtime systems.

In one general aspect, a computer program product, tangibly embodied in an information carrier, includes instructions operable to cause data processing apparatus to compute a fill level of a cache memory, where the cache memory is operable to store entities; use a first eviction technique to evict one or more of the entities in the cache memory if the fill level exceeds a first threshold but not a second threshold; use a second, distinct eviction technique to evict one or more of the entities in the cache memory if the fill level exceeds the second threshold but not a third threshold; and decline subsequent requests to store additional entities in the cache memory if the fill level exceeds the third threshold.

Implementations can include one or more of the following features. The first eviction technique can be a background technique that operates independently of requests to store entities in the cache memory; and the second eviction technique can be an active technique that operates in conjunction with the requests to store entities in the cache memory.

The instructions to compute the fill level can include instructions to compute a measurement of each of a set of fill metrics, where each of the fill metrics can be associated with a number of thresholds, each of the fill metrics can be used to measure cached entities, and a combination of the measurements are used to determine the fill level of the cache. The cached entities can include the entities in the cache memory that are live and the entities in the cache memory that have been marked for deletion but whose memory has not yet been reclaimed. A first fill metric can be an amount of cached entities, a second fill metric can be a total amount of memory being used by the cached entities, and the instructions to compute the fill metrics can include instructions to count the amount of cached entities in the cache memory to compute a measurement of the first fill metric; and compute a total amount of memory being used by the cached entities in the cache memory to compute a measurement of the second fill metric. Each of the fill metrics can have an associated first threshold level, an associated second threshold level, and an associated third threshold level, and the fill level of the cache can exceed the first threshold if each of the fill metrics exceeds the associated first threshold level; the fill level of the cache can exceed the second threshold if each of the fill metrics exceeds the associated second threshold level; and the fill level of the cache can exceed the third threshold if each of the fill metrics exceeds the associated third threshold level.

The instructions to evict one or more of the entities in the cache memory include instructions to identify one or more entities to evict in accordance with an eviction policy. The eviction policy can approximate a least-recently-used policy. The eviction policy can be implemented by a user-specified plug-in module. The cache memory can include a shared memory area accessible by runtime systems in a server computer. The runtime systems can include one or more of Java virtual machines or Common Language Runtime virtual machines. The entities in the cache memory can be stored in shared closures. The entities in the cache memory can be Java objects, and the requests to store additional entities in the cache memory can be generated by user code executing in a Java virtual machine. The instructions to compute a fill level of a cache memory can include instructions to compute a fill level of a cache memory storing shared closures of entities.

In another aspect, a computer program product, tangibly embodied in an information carrier, includes instructions operable to cause data processing apparatus to compute a fill level of a cache memory used by Java virtual machines, where the cache memory is operable to store entities and computing a fill level includes computing an amount of memory occupied by entities in the cache memory.

Implementations can include one or more of the following features. The instructions to compute a fill level of a cache memory can include instructions to compute a fill level of a cache memory storing shared closures of entities.

In another aspect, a cache framework includes machine-implemented mechanisms operable to compute a fill level of the cache memory; if the fill level exceeds a first threshold but not a second threshold, use a first eviction technique to evict one or more of the entities in the cache memory; if the fill level exceeds the second threshold but not a third threshold, use a second, distinct eviction technique to evict one or more of the entities in the cache memory; and if the fill level exceeds the third threshold, decline subsequent requests to store additional entities in the cache memory.

Implementations can include one or more of the following features. The cache framework operable to use a first eviction technique to evict one or more of the entities in the cache memory can include the cache framework operable to use a background technique that operates independently of requests to store entities in the cache memory; and the cache framework operable to use a second, distinct eviction technique to evict one or more of the entities can include the cache framework operable to actively evict cache entries and store entities in the cache memory that correspond to requests to store cache entities.

The cache framework operable to compute the fill level can include the cache framework operable to compute a measurement of each of a set of fill metrics, where each of the fill metrics can be associated with a number of thresholds, each of the fill metrics can be used to measure cached entities, and a combination of the measurements can be used to determine the fill level of the cache. The cache framework operable to evict one or more of the entities in the cache memory can include the cache framework operable to identify one or more entities to evict in accordance with an eviction policy.

The cache memory can be a shared memory, the cache framework can be operable to access the shared memory, and the cache framework can be accessible by runtime systems in a server computer. The runtime systems can include one or more of Java virtual machines or Common Language Runtime virtual machines. The entities in the cache memory can be Java objects, and the requests to store additional entities in the cache memory can be generated by user code executing in a Java virtual machine. The cache framework operable to compute a fill level of a cache memory can include the cache framework operable to compute a fill level of a cache memory storing shared closures of entities.

The cache eviction for runtime systems described here can be implemented to realize one or more of the following advantages.

Eviction of cached entities can include the use of multiple thresholds. Depending on which of the thresholds are exceeded, distinct processes (i.e., techniques) can be used. For example, three thresholds can be defined and three different processes can correspond to those thresholds. By having multiple thresholds, eviction can be optimized such that access and performance of the cache system need not be compromised at lower fill levels.

Cached entities can be evicted based on a combination of metrics. For example, an amount of entities in a cache and a size of the cache can be used as metrics. By using multiple metrics, eviction can be optimized. For example, if only an amount of entities were used as a metric and several cached entities were large, a cache can cache only a few entities without regard to the size of the cache and the cache can become enormous. As another example, if only a cache size were used as a metric and many cached entities were very small, a cache could be small and cache thousands of entities, which could impact performance of the cache (e.g., by generating high administration costs).

A centralized shared cache for multiple runtime systems can implement eviction policies. As such, administration costs of caching entities for multiple runtime systems can be reduced, as administration of the cache is centralized and need not be redundant (e.g., each runtime system need not have a corresponding cache framework that administers eviction of cached entries).

Eviction policies for a cache can be implemented as a plug-in to a cache system. Thus, different eviction policies can be easily implemented in a cache system.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 8 is an illustration corresponding to a cache system in which multiple thresholds are associated with multiple fill metrics.

Like reference numbers and designations in the various drawings indicate like elements.

DETAILED DESCRIPTION

A Client/Server System

Figure 1:
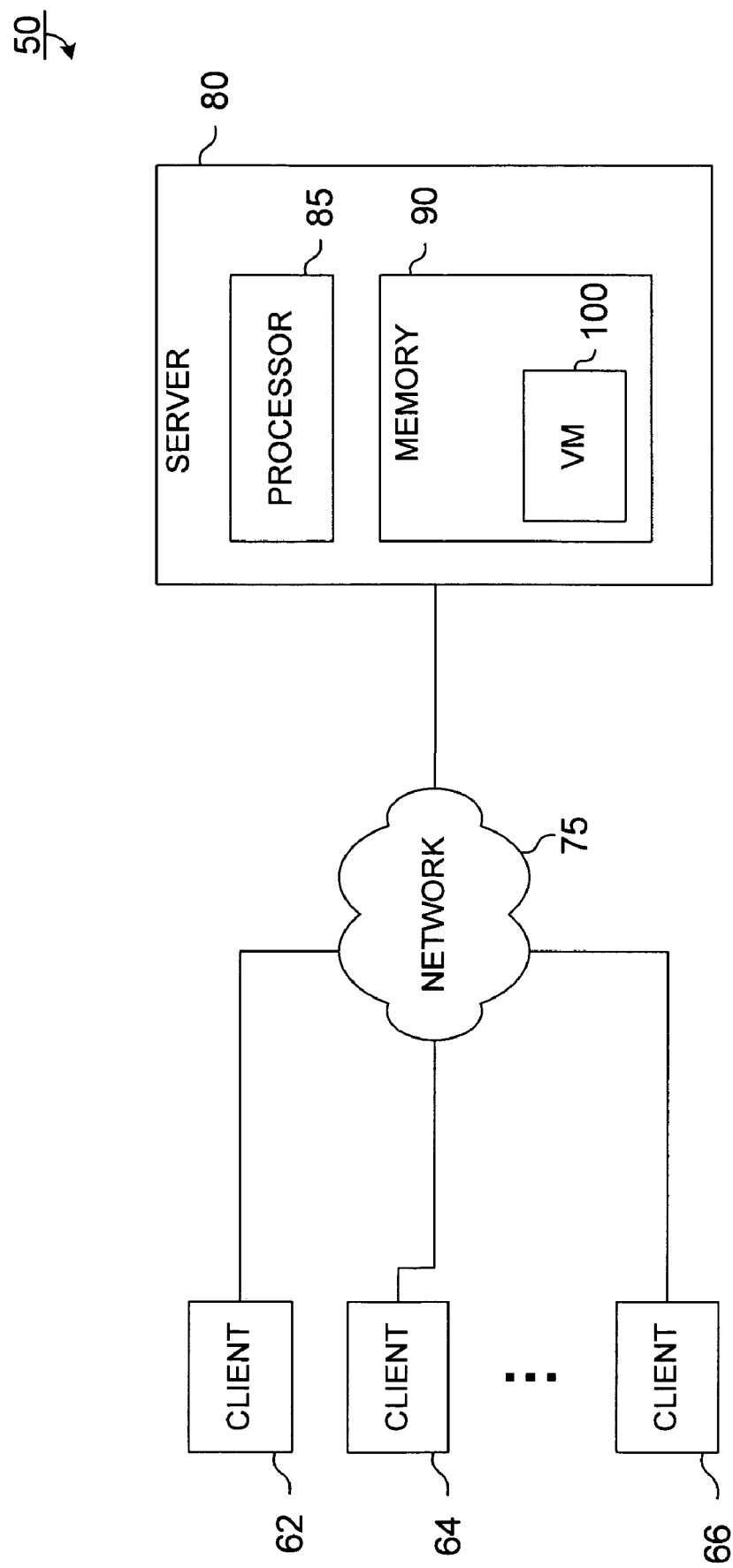
FIG. 1 is a block diagram of an exemplary client/server system.

FIG. 1 illustrates a client/server system 50 in which a network 75 links a server 80 to client systems 62, 64, and 66. The server 80 is a programmable data processing system suitable for implementing apparatus, programs, or methods in accordance with the description. The server 80 provides a core operating environment for one or more runtime systems that process user requests. The server 80 includes a processor 85 and a memory 90. The memory 90 can be used to store an operating system, a Transmission Control Protocol/Internet Protocol (TCP/IP) stack for communicating over the network 75, and machine-executable instructions executed by the processor 85. In some implementations, the server 80 can include multiple processors, each of which can be used to execute machine-executable instructions. The memory 90 can include a shared memory area 92 that is accessible by multiple operating system processes executing in the server 90. An example of a suitable server that can be used in the client/server system 50 is a Java 2 Platform, Enterprise Edition (J2EE) compatible server (Java virtual machine specification available from Sun Microsystems, Santa Clara, Calif.), such as the Web Application Server developed by SAP AG of Walldorf (Baden), Germany (SAP), or the WebSphere Application Server developed by IBM Corp. of Armonk, N.Y.

Client systems 62, 64, and 66 can execute multiple applications or application interfaces. Each instance of an application or an application interface can constitute a user session. Each user session can generate one or more requests to be processed by the server 80. The requests can include instructions or code to be executed on a runtime system (e.g., the virtual machine 100) on the server 80.

Shared Closures

Runtime systems can share data entities in order to reduce resource and time consumption (e.g., the time required to build and initialize multiple copies of an object, and the memory required to store those copies). Entities can be shared through various techniques. For example, entities can be shared by storing them in a shared memory area or heap that is accessible by multiple runtime systems.

In general, entities that are shared through a shared memory heap should not have any pointers or references into any private heap (e.g., the local memories of individual VMs). If an entity in the shared memory heap has a member variable with a reference to a private entity in one particular VM, that reference would be invalid for other VMs that use that shared entity. More formally, this restriction can be thought of as follows: for every shared entity, the transitive closure of the entities referenced by the initial entity should only contain shared entities at all times.

Accordingly, in one implementation, entities are not put into the shared memory heap by themselves—rather, entities are put into the shared memory heap in groups known as "shared closures." A shared closure is an initial entity plus the transitive closure of all the entities referenced by the initial entity.

Figure 2A:
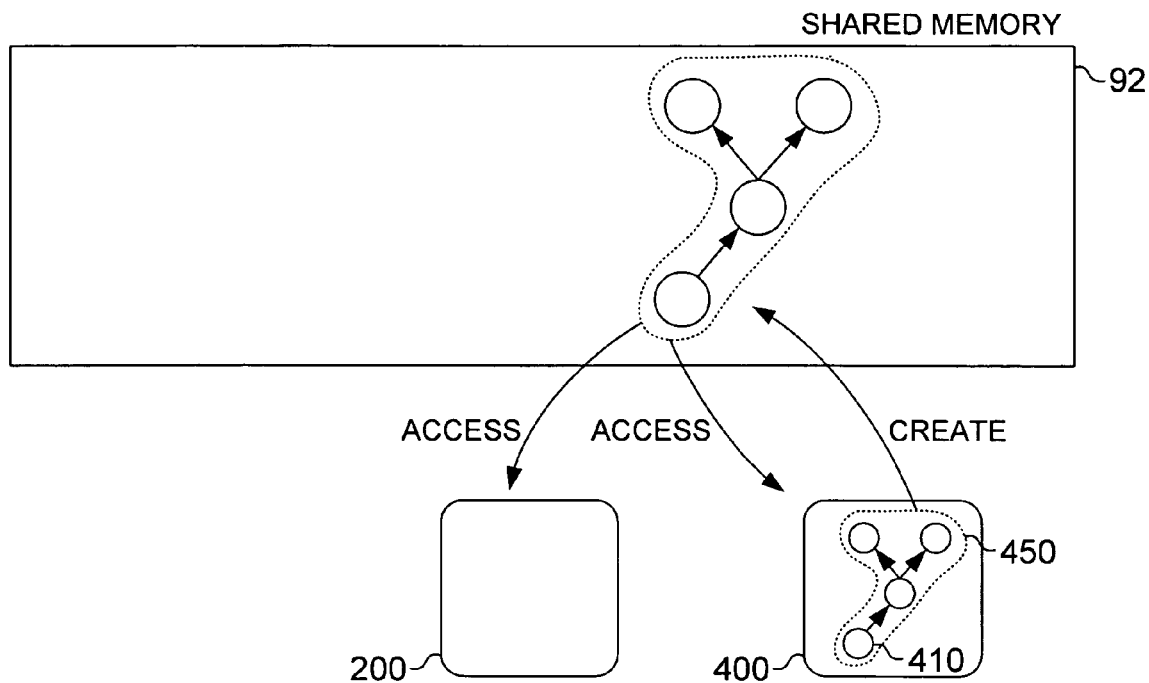
FIGS. 2A and 2B illustrate the sharing of entities between VMs in a client/server system.

The sharing of entities through shared closures is shown conceptually in FIG. 2A, where a shared closure 450 has been identified in the local memory of a first VM 400 by grouping a first data entity 410 with the transitive closure of all the entities referenced by the first entity 410. After the shared closure 450 has been identified, the VM 400 can create the shared closure in a shared memory area 92, for example, by copying the shared closure 450 into the shared memory area 92. After the shared closure 450 has been created in the shared memory area 92, it can be accessed by the VMs in the server (e.g., VMs 200 and 400). A VM can access the shared closure 450 from the shared memory area 92 by, for example, mapping or copying the shared closure 450 from the shared memory area 92 into the address space of a process in which the VM is executing.

In order to qualify for use within a shared closure, an entity must be "shareable." In general, a complex data structure (e.g., a heap or a portion thereof) in one runtime system (e.g., a Java VM) can be shared with a second runtime system if the data structure can be disassembled and then reassembled in the native format of the second runtime system without breaking the internal consistency or functionality of the data structure.

In one implementation, entities are shared through the copying of shared closures to and from shared memory. For an entity to be shareable in such an implementation, the entity has to withstand a transparent deep-copy into the address space of another VM without breaking the internal consistency or functionality of the entity. The shareability conditions for such an implementation generally require the class of which the entity is an instance not to execute any custom code in serializing or deserializing an instance of the class. Additional details about techniques for sharing entities (including shareability requirements and the creation and use of shared closures) can be found in, for example, U.S. patent application Ser. No. 10/851,795, entitled "Sharing Objects in Runtime Systems," filed on May 20, 2004.

Figure 2B:
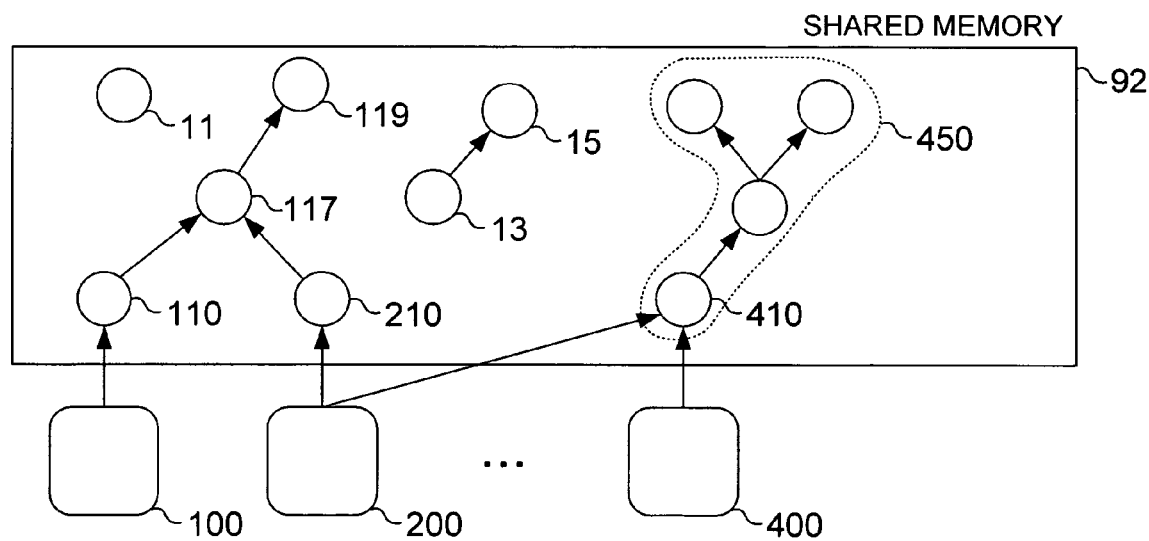

FIG. 2B illustrates a snapshot of a shared memory area 92, which includes multiple entities being shared by a set of VMs (e.g., the VMs 100, 200, and 400). The shared entities include several entities that are directly referenced by the VMs (e.g., the shared entities 110, 210, and 410). The entities that are directly referenced by one or more of the VMs can be thought of as forming a "root set" of shared entities.

The shared entities that are directly referenced by the VMs may themselves reference other shared entities (e.g., the shared entities 117 and 119). The latter shared entities can be thought of as being indirectly referenced by the VMs, since there are one or more predecessor entities in the chain of references from the VMs to those entities.

Finally, the shared entities in the shared memory area 92 also include a number of entities that are not currently referenced, either directly or indirectly, by any VM (e.g., the entities 11, 13, and 15). It is these entities, which are not reachable by any sequence of references from the root set of shared entities, which can be deemed no longer used and which can thus be garbage collected.

Figure 3:
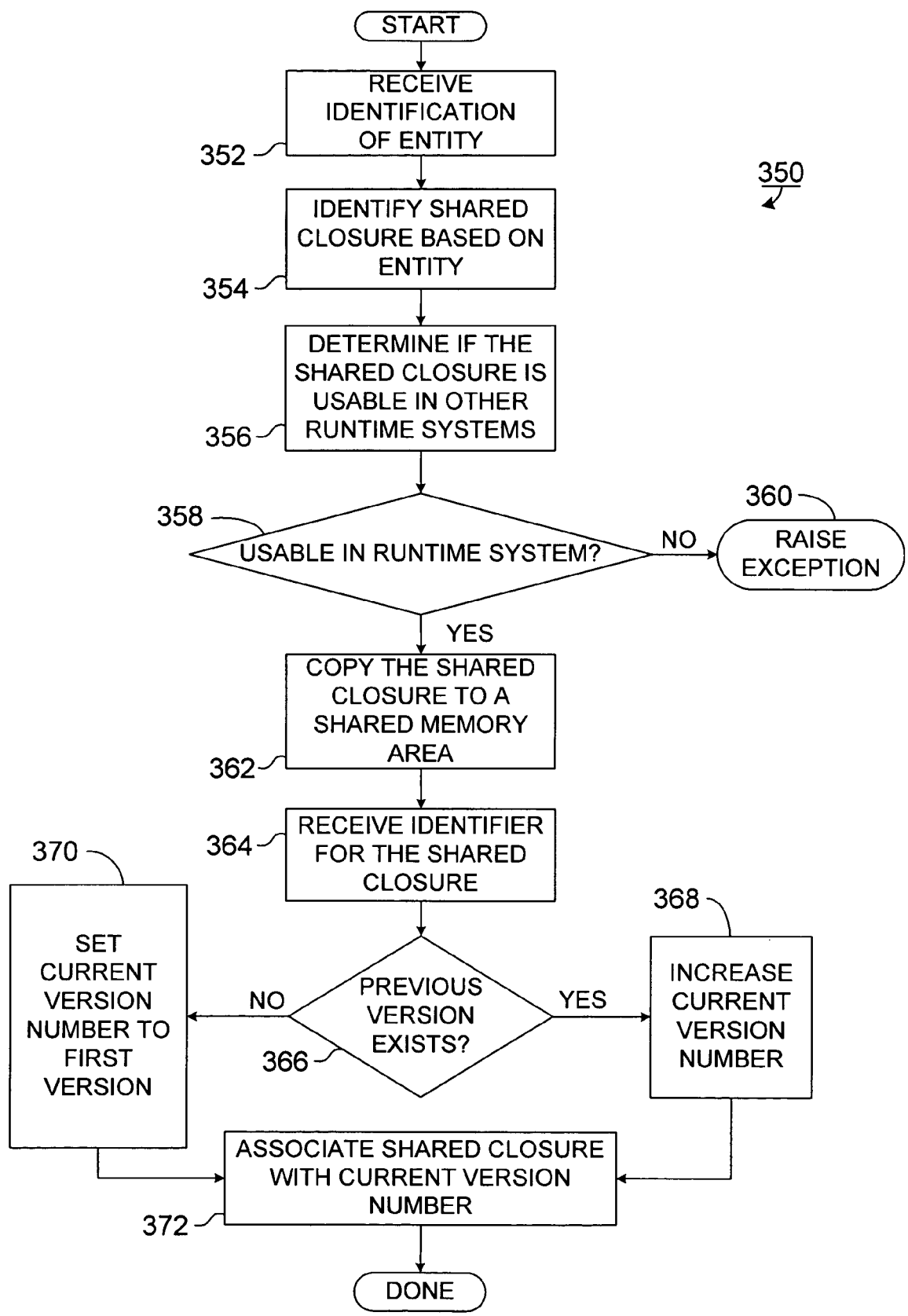
FIGS. 3 and 4 are flowcharts illustrating processes for creating and using shared objects.
Figure 4:
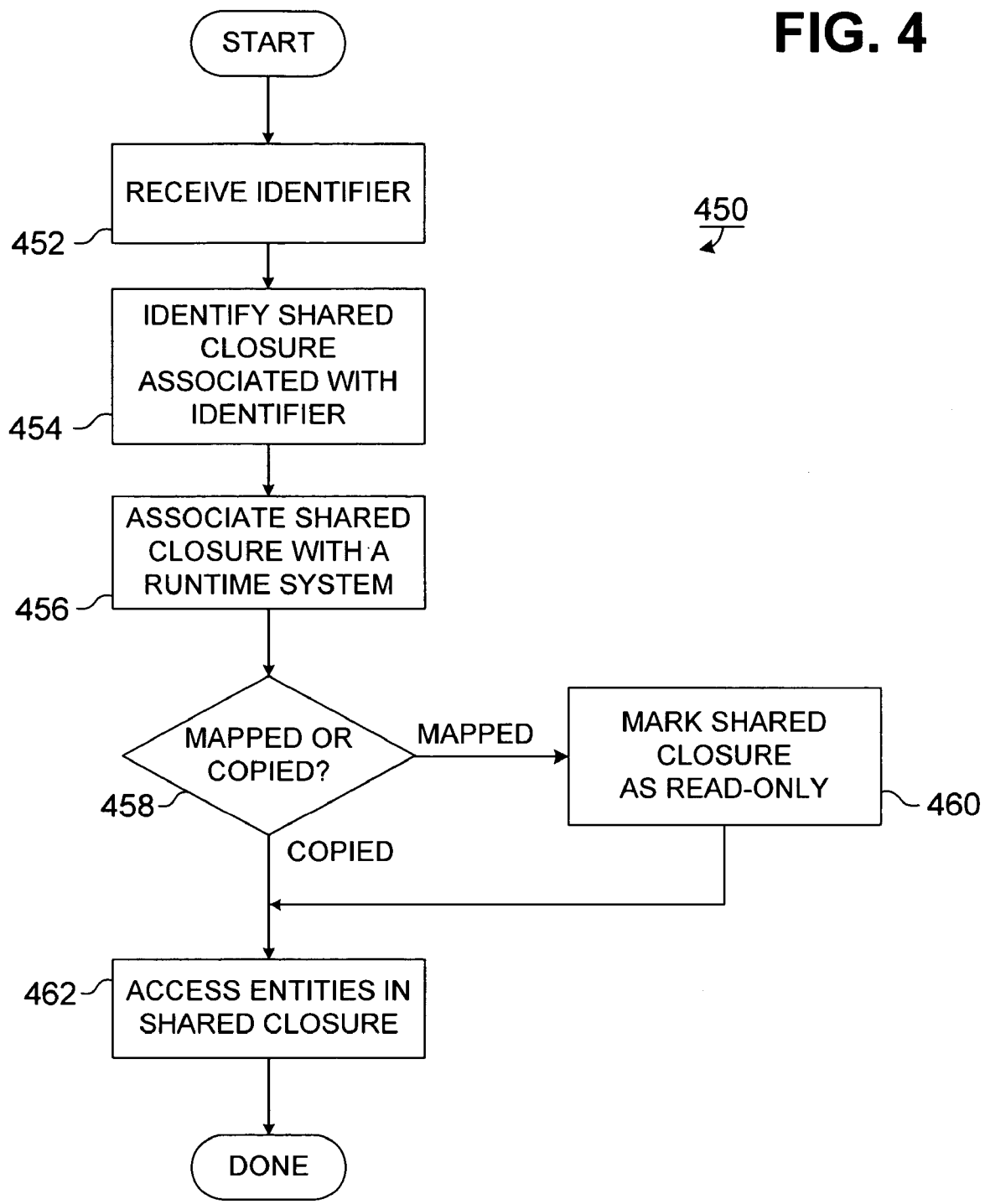

The creation and use of shared closures, which are shown in FIG. 2A, can be realized by sample processes 350 and 450 illustrated in FIGS. 3 and 4.

The process 350 depicts an example process that can be used to create a shared closure. In the process 350, an identification of an initial entity in a first runtime system (e.g., a VM) is received (352). A shared closure—i.e., the initial entity plus the transitive closure of all the entities that are referenced by the initial entity—is then identified (354), and a determination is made regarding whether the shared closure can be used in or shared by another runtime system (e.g., another VM) (356). This determination can be made, for example, by determining whether the entities in the shared closure are shareable (or more precisely, by determining whether each object instance in the shared closure is a shareable object instance).

If the shared closure is not usable in another runtime system ("no" branch of decision 358), the process 350 raises an exception or generates some type of negative indication. For example, if the entities in the shared closure are not all shareable entity instances, the process can raise an exception to indicate that the initial entity and its shared closure are not shareable.

If the shared closure is usable in other runtime systems ("yes" branch of decision 358), the process 350 invokes a mechanism to make the shared closure available to the other runtime systems. For example, if entities are shared through the use of shared memory, the shared closure can be copied to a shared memory area (362). In that example, if a VM stores the shared closure in a shared memory area, the VM can know the address of the shared closure. If the VM stores the entities in a shared closure in consecutive entries according to addresses, the VM can now the starting address and ending address of the entities in a shared closure, and thus, know the bounds of the shared closure. In other implementations, the shared closure can be transmitted to one or more runtime systems (e.g., other VMs) through the use of messages or other means of communication.

The process of creating a shared closure can also involve associating a specified name or other identifier with the shared closure (364). Such an identifier can subsequently be used by other runtime systems to identify the shared closure to be accessed.

In some implementations, the process of creating a shared closure also involves the use of versioning. In the process 350, versioning is accomplished through the use of version numbers that are associated with the shared closures stored in shared memory. When a shared closure is created with a given name, a determination is made regarding whether a shared closure with that name already exists in shared memory. If such a shared closure does exit ("yes" branch of decision 366), the current version number associated with the shared closure is increased (368), and the new current version number is associated with the newly created shared closure (372). If there is no shared closure with the given name in shared memory ("no" branch of decision 366), the current version number for the new shared closure is set to a number that indicates a first version (e.g., 0 or 1) (370), and associated with the newly created shared closure (372).

Versioning can be used to update shared closures—e.g., a new, updated version of a shared closure can be created under the same name previously given to the shared closure. In one implementation, when a new version of a named shared closure is created, all subsequent operations to associate the named shared closure with a VM use the new version of the shared closure. VMs that are already accessing the shared closure (e.g., VMs that have a previous version of the shared closure mapped into their address space) are not affected by the new version—they simply keep all entity references to the old version. In this implementation, multiple versions of a shared closure can coexist in shared memory until the obsolete versions are no longer referenced by any VM and thus can be garbage collected.

As part of creating a shared closure, properties of the shared closure can be stored in, for example, a hashmap that has key/value pairs corresponding to identifiers of shared closures of entities and meta information for each shared closure. The meta information can include properties such as an amount of memory a shared closure consumes and the starting address of the shared closure. These properties can be determined as part of the process of creating a shared closure. The size of each shared closure can be determined because, as a runtime system creates a shared closure in shared memory, the runtime system must allocate memory for the shared closure (at the OS level) and place the shared closure in shared memory. Different techniques can be used to determine the size of a shared closure. The size of a shared closure can be determined in one example implementation based on the starting and ending addresses that define the bounds of the shared closure, if the entities in the shared closure are stored in contiguous memory (e.g., determined by subtracting the starting address from the ending address). In another example implementation, as the memory is dynamically allocated for entities in a shared closure, the size of the entities and components of entities (e.g., primitives in an object) can be tracked to determine the total size of a shared closure of entities.

FIG. 4 illustrates a flowchart of a sample process for accessing and using a shared closure. In the process 450, a name or other identifier is received (452) and used to identify an associated shared closure (454). The name or other identifier corresponds to the identifier that was associated with the shared closure when the shared closure was created (e.g., in the operation 364 in the process 350). Where versioning is implemented, if more than one version of a specified shared closure exists, the most recently created version of the specified shared closure is identified.

The identified shared closure is then associated with a runtime system (e.g., a VM) (456). In one implementation, a shared closure can be associated with a runtime system in one of two ways—either by mapping the shared closure from a shared memory area into the address space of the runtime system, or by copying the shared closure from the shared memory area into the address space of the runtime system. After the shared closure has been associated with the runtime system, the entities within the shared closure can be accessed using normal operations (e.g., normal Java operations) (462).

In some implementations, access to the entities in a shared closure may depend on how the shared closure is associated with the runtime system. For example, in one implementation, if a shared closure is mapped into the address space of a VM ("mapped" branch of decision 458), access to the entities in the shared closure is restricted to read-only access (460). Because of this restriction, any attempt to write to a member variable of an entity instance in the shared closure will result in an error. This restriction can be useful to prevent VMs from "breaking" shared entity instances by, for example, overwriting a reference member variable in a shared object instance with a reference into a VM's private heap, or otherwise breaking the internal consistency or functionality of the shared entities.

If, on the other hand, a shared closure is copied into the address space of a VM ("copied" branch of decision 458), the VM is granted full read-write access to the copied entities. In such an implementation, the entities in a shared closure can thus be updated by copying the shared closure into the address space of a VM, modifying the content of the entities in the shared closure, and then creating a new version of the shared closure in shared memory (e.g., using the process 350 shown in FIG. 3).

Other approaches can be used to associate a shared closure with a runtime system and to provide access to the entities in the shared closure from the runtime system. For example, a copy-on-demand approach can be used. In one such implementation, a shared closure is mapped into the address space of a VM without restricting access to the shared closure to read-only access. Instead, access to the shared closure is monitored, and, upon detecting the first attempted write access to the shared closure, the shared closure is copied into the address space of the VM, thereby transforming the shared closure from a mapped shared closure into a copied shared closure. The attempted write access is then allowed to complete, and subsequent read and write accesses to the copied shared closure can proceed as they would normally. If the heap address of a shared closure changes when the transformation from a mapped shared closure to a copied shared closure occurs, existing references to the heap have to be redirected to the newly created copy of the shared closure. Alternatively, underlying OS (operating system) features can be used to map a shared closure in a manner that allows the OS to provide copy-on-demand functionality without heap address changes.

In addition to functions for creating, mapping, and copying shared closures; an Application Programming Interface (API) can include additional functions for managing shared entities. For example, an API can also include a "delete" function. One implementation of a "delete" function takes a name or other identifier as an input parameter, and marks the associated shared closure in shared memory as being deleted. Marking a shared closure as deleted does not affect VMs that are already accessing the shared closure, but VMs that subsequently try to access the shared closure (e.g., by mapping or copying the shared closure into their address spaces) are precluded from doing so.

In an implementation of a server (e.g., the server 80) in which shared closures can be mapped into the address spaces of VMs, garbage collection for deleted or obsolete versions of shared closures can be performed by keeping track of the number of VMs that have a shared closure mapped into their address space. A count can be incremented each time a VM maps a shared closure into its address space. The count can be decremented when, in the course of its own garbage collection, a VM determines that it no longer includes any references into the previously mapped shared closure. When the count associated with a particular shared closure reaches zero, that shared closure can be deleted from shared memory.

In Java, an object instance typically includes a reference to a runtime representation of the class of the object instance, and the class runtime representation in turn contains a reference to a class loader for the class. Consequently, the runtime representation and the class loader associated with a Java object instance are included in the shared closure of the object instance, which means that the runtime representation and the class loader must themselves be shareable in order for the object instance to be shareable. Thus, in a server implementation that includes class runtime representations and class loaders, two additional criteria can be used to determine whether a particular class is shareable: The class should have a shareable runtime representation and a shareable class loader. Various techniques can be used to deal with class runtime representations and class loaders (i.e., to make class runtime representations and class loaders "shareable") and can be found in U.S. patent application Ser. No. 10/851,795, entitled "Sharing Objects in Runtime Systems," filed on May 20, 2004.

The manner in which the shared closure is associated with the VM depends on the type of access needed by the VM. As indicated above, in one implementation, mapped shared closures are restricted to read-only access, so as to prevent a mapping VM from breaking a shared object instance in the shared closure by setting a member variable to a value that is not valid in other VMs. In such an implementation, if the VM associated with the user session only needs read access to the entities (i.e., if the VM does not need to modify any of the entities in the shared closure), the shared entities can be mapped into the address space of the selected process. The VM can then process the request, reading information from the shared entities as necessary.

If the VM needs read-write access to the shared entities (i.e., if the VM needs to modify one or more of the entities), the shared closure can be copied into the address space of a process. The VM can then have full read-write access to the shared entities, and it can process the request and modify the entities as necessary. When the VM is finished modifying the shared entities, the VM can copy the shared closure back to shared memory. As indicated previously, in one implementation, a shared closure can be copied to shared memory by re-creating the shared closure (e.g., by invoking a "create" function, assigning the same previously used name to the shared closure, and generating a new version of the shared closure if an old version of the shared closure with that name still exists in shared memory). The entities in the shared closure can include any type of entity, including entities that store user context information.

A Centralized Cache

A runtime system may include a cache, which is a temporary storage, in a memory, for entities accessed by application programs running in the runtime system. The memory used for a cache can be volatile memory of a computer system, a storage device, a database, or another type of memory in which entities to be cached can be stored. Temporary storage in a cache implies that entities put in a cache are not expected to remain in the cache. For example, after an entity is put in a cache, if at a later point in time an access of the cache is made in response to a request to retrieve that entity, the entity might not exist in the cache and the requestor might not have been notified when the entity was removed from the cache.

A data source can be chosen for a cache such that an entity in the cache can be accessed quicker from the cache than from another source (e.g., a source from which the entity originated). For example, a cache may be volatile memory in a server computer system (e.g., main memory) and an entity may originate from a storage device (e.g., a hard disk drive). In that example, the entity should be accessed quicker from the cache than from the original source, as entities typically can be accessed quicker from volatile memory than storage devices.

A cache framework can manage many aspects of a cache, such as storing entities in the cache, retrieving entities from the cache, evicting entities in the cache, and the like. A cache, and in particular a cache framework, can be accessed by a request from an application in a runtime system or by a request from the runtime system itself (e.g., if the runtime system automatically uses the cache as a redundant storage to have quicker access to entities).

Not all runtime systems have a cache, for example, the Java VM does not have a cache as a standard part of the VM, nor is it part of the Java specification. Rather, implementers of a VM must implement a cache. In an example implementation, there can be one cache per a VM and the cache can be part of the heap of the VM (i.e., part of the dynamic memory allocated and/or used by the VM). The cache can be implemented such that an application can access the cache through an application programming interface (API). API calls can include put( ) and get( ), where put( ) is an API call to put an entity in the cache and get( ) is an API call to retrieve an entity from the cache.

A cache can be implemented as a shared cache, such that cached entities can be shared across multiple VMs. For example, a cached entity may be accessed by one runtime system, modified by that runtime system, and then the modified version of the cached entity may be retrieved by another runtime system. Some implementations of a shared cache can have a centralized shared area for sharing cached entities. Advantageously, a centralized shared cache can reduce administration costs of caches on a client/server system that would otherwise have multiple caches for multiple runtime systems. In addition, resources usage, such as processing time and memory consumption, can be reduced. As an example, several entities need not be in multiple caches across a server landscape of runtime systems if a centralized cache is used, thus, memory consumption can be reduced. As another example, objects need not be updated across a server landscape if a centralized cache is used, thus, processing time can be reduced.

Figure 5:
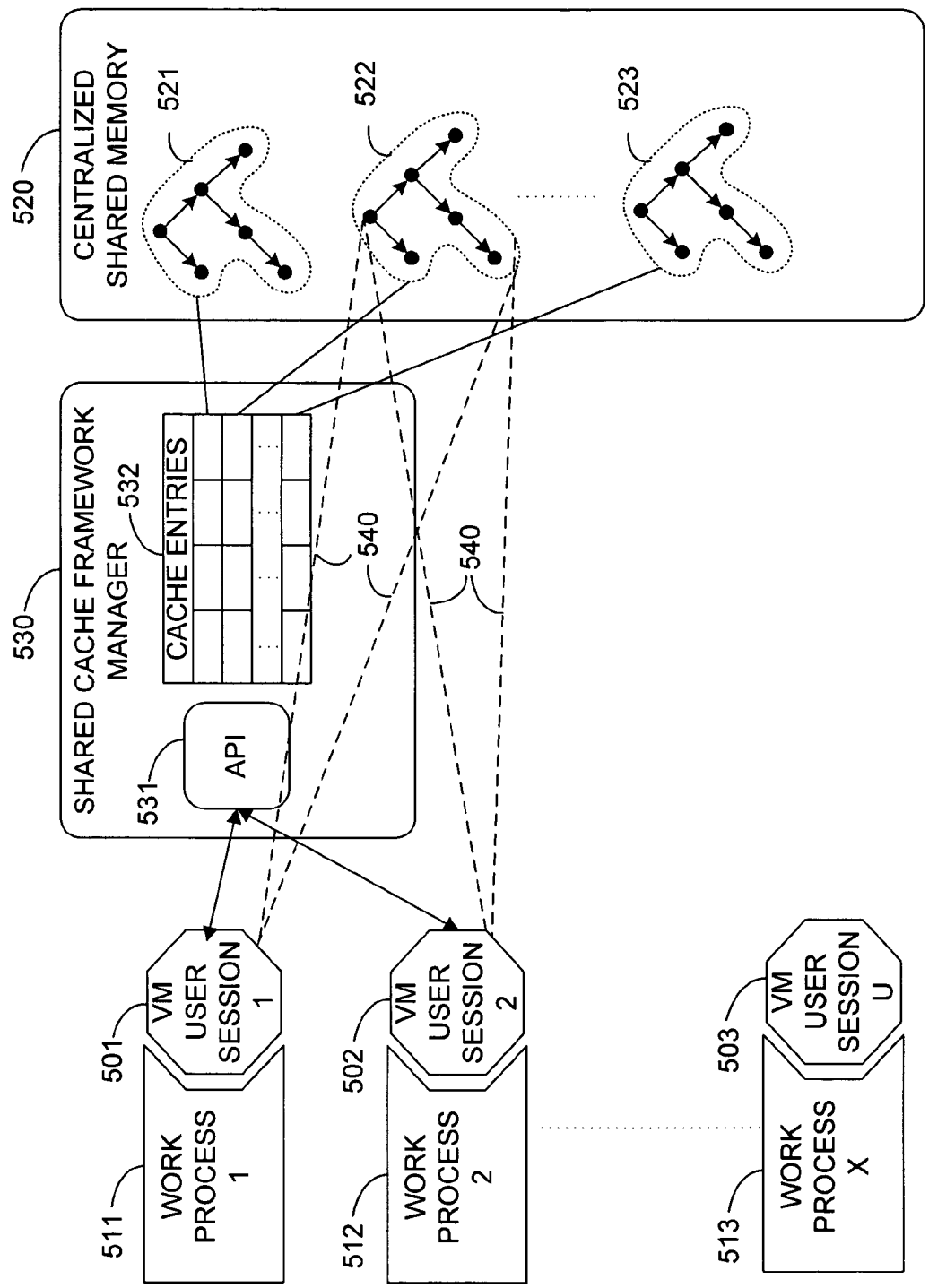
FIG. 5 is an illustration of a system landscape including multiple VMs, a centralized shared memory, and a shared cache framework manager.

FIG. 5 is an illustration of a system landscape including multiple VMs 501, 502, and 503, a centralized shared memory 520, and a shared cache framework manager 530. In FIG. 5, the VMs (501, 502, and 503) are process-attachable VMs. In a server where VMs are process-attachable, each user session is provided with its own VM in order to isolate user sessions from each other and thereby increase the robustness of the system. More specifically, each user session can be provided with its own process-attachable virtual machine (PAVM), which is a VM that can be attached to and detached from an OS process. A process-attachable VM is instantiated and used for each user session—for example, VM 501 is instantiated and used for user session 1, and VM 502 is instantiated and used for user session 2. In general, a server, in one implementation, can have U user sessions, and X PAVMs. This is shown in FIG. 5 by VM 503, which corresponds to user session U.

In operation, when a server receives a request, a special process (e.g., a dispatcher process) dispatches the request to one of the available work processes in a pool of work process. Assuming that the request corresponds to user session 1 (which in turn corresponds to the VM 501), and that the dispatcher process dispatches the request to work process 511, the server attaches or binds the VM 501 to work process 511 in order to process the request. After the request has been processed, the server can detach VM 501 from the work process 511. Work process 511 can then be used to process another request. For example, if the server receives a new request that corresponds to user session 2, and the dispatcher process dispatches that request to the work process 511, the corresponding VM 503 can be attached to the work process 511 to process the new request. Continuing with this example, if the server receives another request corresponding to user session 1 while work process 511 is still being used to process the request corresponding to user session 2, the dispatcher process can dispatch the new request from user session 1 to work process 513, and the VM 501 for user session 1 can be attached to the work process 513 in order to process the new request from user session 1. A server need not have a dispatcher process. For example, in an alternative implementation, user requests can be serially assigned to processes allocated to the server. Each process could maintain a queue of requests, and attach the process-attachable VM of the user session corresponding to the request at a front of the queue in order to process that request. Although the VMs depicted in FIG. 5 that use the centralized, shared cache framework are PAVMs, in alternative implementations, the VMs need not be process-attachable.

In FIG. 5, a cache includes the centralized shared memory 520 and the shared cache framework manager 530. The centralized shared memory 520 is operable to store entities for the shared cache framework manager 530. The shared cache memory 520 can be implemented as main memory of a computer system (e.g., RAM), a storage device (e.g., a hard disk drive), a database, or any other suitable mechanism. The cache memory can be accessed via a plug-interface (referred to as a storage plug-in) such that different types of memories can be used for the cache memory. Entities that can be cached can come from many different types of memory, such as a database, a storage device, main memory, and the like. The source of entities can be accessed via a plug-in referred to as a data source plug-in. In general, memory is shared if multiple processes and/or threads can access a same entity in the memory. The centralized shared memory 520 is a shared memory such that entities in the memory 520 do not have an affinity to any of the VMs (501, 502, or 503) or any of the work processes (511, 512, or 513), and the memory can be accessed by any of the VMs (501, 502, or 503). Cached entities in the shared memory can be part of the heap (i.e., dynamically allocated portion of memory) of one or more of the VMs (501, 502, or 503).

In some implementations, the shared cache framework manager 530 can access the cache by interfacing with the memory 520 via a plug-in, referred to as a storage plug-in. In those implementations, each type of memory that can be used as a cache memory (e.g.s, database, storage device (e.g., hard disk drive), main memory (e.g., local heap), and the like) can be accessed via a storage plug-in. Thus, multiple types of memory can be accessed easily, alone or in combination, by different storage plug-ins. Because there is a standardized interface provided by a plug-in interface, the type of memory can be changed easily. The storage plug-in, in addition to defining the type of media, can define how the items are stored. For example, there can be two storage plug-ins, one for mappable shared closures (i.e., shared closures that can be mapped and, in some implementations, copied) and one for copy-only shared closures (i.e., shared closures that can only be copied).

The shared cache framework manager 530 includes an API 531 and a cache entry table 532. API calls to the shared cache framework manager 530 are received via the API 531. In other words, applications can include code to cache entities in the cache. API calls can include, a request for a measurement of the amount of memory used by the centralized shared memory 520, a request to retrieve one or more entities in the centralized shared memory 520 (e.g., a get( )), a request to store one or more entities in the centralized shared memory 520 (e.g., a put( )) and a request to remove one or more entities in the cache (e.g., a remove( )). Thus, for example, an application can include a put( ) call, where an entity is stored in the cache, and the application can later attempt to access the cached entity via a get( ) call. If the entity no longer exists in the cache (e.g., the entity was explicitly removed by an application or an eviction policy caused the entity to be removed), an error message can be returned; otherwise, the cached entity can be returned to the application.

The shared cache framework manager 530 manages the cache entry table 532. The cache entry table 532 indicates whether an entity is in the cache and indicates locations of entities in the cache (i.e., locations within the centralized shared memory 520). Any type of data structure can be used to implement the cache entry table 532. In one example implementation, a set of hash maps (i.e., a data structure that maps keys to values) are used as the cache entry table 532. In that example, hash codes can be generated based on a chosen key for an entity (e.g., a name of the entity). The set of hash maps can include one hash map for the location of a cached entity and other hash maps for properties of cached entities. In that way, properties can be edited without having to retrieve a cached entity (in contrast to, for example, having properties included with a cached entity). In the first hash map, a hashed entry (i.e., a hash code) can be associated with an indication of the location of the entity in a shared memory (e.g., a pointer). Another hash map can include an association of the hashed entry with an indication as to whether the item is locked (e.g., cached entries can be locked if it is decided that concurrent access to a cached entity should not be granted). And, another hash map can include an association of the hashed entry with an indication of the size of a cached entity (e.g., the size of a shared closure of entities). Thus, for example, the name of an entity can be sued by the cache framework manager 530 to access a cached entity by and/or modify entries in the cache entry table 532 that correspond to entities stored in the centralized shared memory 520. Alternative implementations of a cache system can use mechanisms and/or techniques other than the cache entry table 532 to manage cached entities.

In alternative implementations, the cache framework manager 530 need not have an API. For example, applications can interface with the centralized cache using other techniques and/or mechanisms, which might include manually accessing the cache entry table 532 from applications, applications managing the cache entry table, and applications directly accessing the centralized shared memory 520.

The centralized shared memory 520 includes shared closures of entities 521, 522, and 523. Shared closures of entities (as described earlier) allow some entities to be shared across runtime systems that would otherwise not be shareable. For example, objects that include references to other objects might not be shareable across runtime systems as they can have references and the like that represent an affinity between a virtual machine and the objects. Shared closures of entities overcome this obstacle by including the transitive closure of all entities such that entities, such as Java objects, can be shared across runtime systems and the affinity between an object and a local heap, can be removed.

In operation, the cache system depicted in FIG. 5, including the shared cache framework manager 530 and the centralized shared memory 520, is a centralized shared cache system. The system is centralized such that each of the VMs 501, 502, and 503 can access a single copy of a cached entity. For example, an application running in the VM 501 can cause a first shared closure of entities 522 to be cached in the centralized shared memory 520. Then, any of the VMs can access the shared closure of entities 522. For example, as depicted in FIG. 5, the dotted lines 540 illustrate that both an application running on the VM 501 and an application running on the VM 502 are accessing the shared closure of entities 522 concurrently. Although in FIG. 5, the lines 540 depict that the shared closure of entities 522 can be accessed by two VMs concurrently, in some implementations, entities in a cache might not be accessible concurrently.

In some implementations, the cache need not be the only type of heap available to a runtime system. For example, other types of dynamically allocated memory, such as a local non-cached heap, can be used in addition to a cache. In some implementations, different scopes can be provided for different runtime and/or computer system configurations. For example, an application may have a choice of a scope of caching entities. The scope can include a centralized shared cache for a single computer system (e.g., a single server), or sharing an entity in a shared cache across a cluster of computer systems (e.g., a cluster of servers). In combination with a non-shared cache, an application can have an ability to choose three scopes of caching entities including, local heap non-shared cache, single-computer system shared cache, or cluster-wide shared cache. As such, one or more centralized shared caches can be implemented in conjunction with a non-shared cache. For example, in one implementation, a runtime system can have a local cache (i.e., non-shared, not centralized), each computer system on which multiple runtime systems can run can have a centralized shared cache system (e.g., a centralized cache per a server), and a centralized shared cache system can be implemented for a cluster of computer system including each of the computer systems with a centralized shared cache limited in scope to the computer system (e.g., a centralized cache per a cluster of servers).

Figure 6:
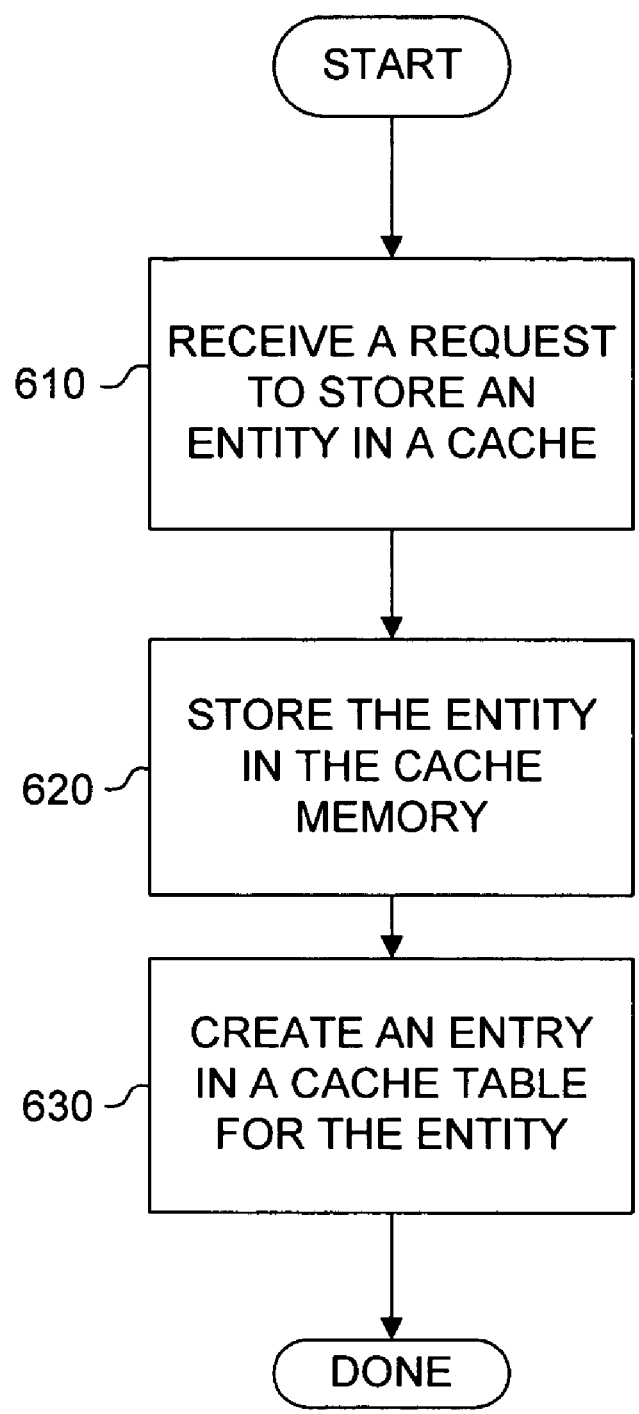
FIG. 6 is a flowchart of a process of responding to a user request to store an entity in a cache.

FIG. 6 is a flowchart of a process of responding to a user request to store an entity in a cache. The process starts when a request is received to store an entity in the cache (610). An entity can be, for example, a string, a constant, a variable, an object instance, a class runtime representation, or a class loader. In some implementations, the entities can only be shared closures of entities to ensure shareability of entities in a cache. The request can be received at a cache framework manager, such as the cache framework manager 530. The request can be generated by an application running at a runtime system or by a runtime system itself (e.g., if a runtime system automatically caches entities redundantly). If the cache framework redundantly caches entities, a plug-in referred to as a data source plug-in can be used and that plug-in can facilitate redundant caching of entities. For example, the plug-in can correspond to a persistent storage device (e.g., a hard disk drive) and the plug-in can be used to interface with the storage device such that entities from the storage device are automatically redundantly stored when they are pulled from the storage device. The request can be in the form of an API call. For example, in Java VM cache implementations, an application can make an API call known as put( ), to request that an entity is added to a cache.

In response to the request, the entity can be stored in a cache memory (620). For example, an entity can be stored in the centralized shared memory 520. Storing an entity can involve determining the shared closure of an entity requested to be stored (i.e., determining the transitive closure of entities), and storing the shared closure of entities. Storing shared closures of entities, rather than simply storing an entity (regardless of determining whether there are any references to another entity in that entity) can ensure that entities are shareable (conditions for determining if an entity is shareable and techniques for making an entity shareable are described in more detail). The type of cache memory can be chosen by a specified storage plug-in (as described earlier). For example, storage plug-ins for a cache framework can include a mappable or copy-only shared closure plug-in.

An entry for the entity can be created in a cache table (630), such as the cache entry table 532. Creating the entry can include storing in a hash map an entry that indicates the location of the entity. In addition, it can involve storing properties of the entity. In response to a determination that the entity (i.e., the entity that was requested to be stored) is to be mapped, the entity is stored and an indication that the entity is to be read-only is made (630). In alternative implementations a mapped entity need not be limited to read-only access.

Once an entity is stored in a memory and a cache framework of a cache system has an entry that corresponds to the entity (i.e., once the entity is cached), the entity can be retrieved.

Figure 7:
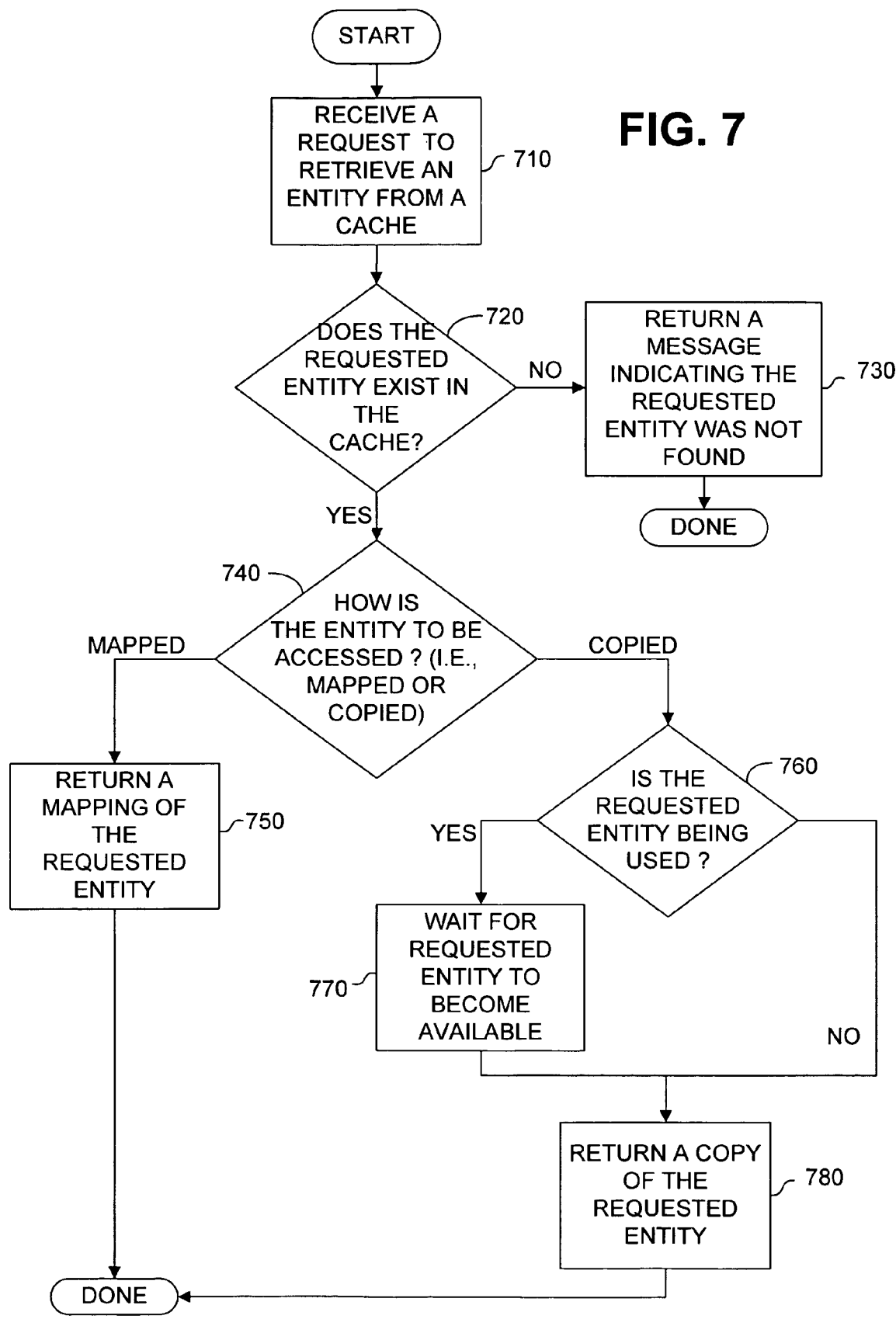
FIG. 7 is a flowchart of a process of responding to a user request to retrieve an entity from a cache.

FIG. 7 is a flowchart of a process of responding to a user request to retrieve an entity from a cache. A request is received to retrieve an entity from the cache (i.e., an entity that might be in the cache) (710). An entity can be, for example, a string, a constant, a variable, an object instance, a class runtime representation, or a class loader. The request can be received at a cache framework manager, such as the cache framework manager 530. The request can be generated by an application running at a runtime system or by a runtime system itself (e.g., if a runtime system automatically caches entities redundantly—i.e., redundant to a data source that can be used to retrieve the entities, such as a data source accessible via a data source plug-in). The request can be in the form of an API call. For example, in Java VM cache implementations, an application can make an API call known as get( ), to request that an entity is retrieved from a cache.

In response to the request to retrieve an entity from the cache, a determination is made as to whether the entity exists in the cache (720). In some implementations, the determination can be made by a cache framework, or more particularly, a cache framework manager of a cache framework. For example, a determination can be made by the cache framework manager 530 of FIG. 5. Determining whether the entity exists in the cache can involve looking up a cache entry in a cache entry table. For example, the cache framework manager 530 can use the cache entry table 532 to determine, based on an identification of the entity (e.g., a key), whether the entity exists in the centralized shared memory 520. If the entity is not in the cache, a message is returned indicating that the requested entity was not found (i.e., the entity does not exist in the cache) (730). The message can be an error message. In alternative implementations, a cache system can perform other appropriate actions. For example, an exception can be raised. Also, in some implementations, no action can be taken.

If the entity was found in the cache (e.g., a cache entry in a cache entry table indicates the entity is stored in a memory), a determination is made as to whether the entity should be mapped or copied (740). If mappable shared closures are chosen to implement the cache, the entity can be mapped or copied depending on a request. For example, a function for retrieving entities from the cache can include two arguments (i.e., get(argument1, argument2)). The first argument can be used to indicate the entity to be retrieved and the second argument can be used to indicate whether a shared closure should be mapped or copied. A program can decide to copy a shared closure if the shared closure is expected to be modified. That decision can then be included in the second argument.

The choice between mapping and copying shared entities can be used to increase performance of the cache by having alternative mechanisms for retrieving entities, where each mechanism is optimized for a type of retrieval. For example, resource consumption can be reduced as mapping a shared closure can be less resource consumptive than copying cached entities to a local heap and some entities need not be copied and those entities can be mapped. In addition, the approach can provide flexibility, as entities in a centralized shared cache can be changed. Also, if locks are implemented, the approach can prevent destructive interaction between runtime systems accessing the same entity by ensuring that cached entities that can be modified are not concurrently accessed.

In alternative implementations, the determination of 740 might not be made. For example, if copy-only shared closures are implemented (e.g., a storage plug-in for copy-only shared closures is used), shared closures are only copied (as mapping of shared closures is not provided). In alternative implementations the type of entities and/or mechanisms for retrieving entities can differ.

Returning to the flowchart of FIG. 7, if the cached entity is to be mapped, then read-only access is granted and a mechanism returns a mapping of the requested entity to the requestor of the entity (750).

If the cached entity is to be copied, then a determination is made as to whether the requested entity is being used (760). The requested entity is in use if another runtime system is accessing the entity. The cache system implementing the process depicted in the flowchart of FIG. 7 can implement locks. Thus, the determination at 760 can be made by determining whether the requested entity is locked. An indication as to whether an entity is locked can be in the cache entry of a cache entry table, such as the cache entry table 532. If the requested entity is being used, the requestor can wait for the requested entity to become available (770). For example, if the requestor was a thread, the thread can yield.

If the requested entity is available, a copy of the requested entity is returned to the requestor (780). Returning a copy of the requested entity includes providing copy access to the entity such that the entity can be changed.

Although not depicted in the flowchart, versioning of cached entities can be implemented (as described above in reference to versioning of shared closures in a shared memory). By allowing versioning of cached entities, multiple copies of a cached entity can be worked on without having to worry about changes being made to a copy that is being worked on. Versioning of cached entities can be limited such that creating versions of entities does not consume too many resources. For example, versioning can be limited to entities that are not expected to be updated frequently (e.g., by choice of a programmer). Versioning of entities can include mapping entities and, if an entity is to be updated, generating an updated version that is also cached (such that entities that are mapped can also be changed). When the older version is no longer referenced, that version can be removed and the updated version can be mapped in future requests to retrieve that entity.

The cache system of FIG. 5 and the processes of FIGS. 6 and 7 can be implemented in a suitable server that runs in a client/server configuration, such as a J2EE compatible server. An example of such a server is the Web Application Server developed by SAP.

Eviction In Caches

Eviction of cached entities can be implemented in a cache system including a centralized shared cache. Once an entity is evicted from cache, the entity is no longer accessible. Typically, cached entities are evicted according to an eviction policy. Processes (i.e., techniques) for evicting cached entities can be based on a fill level of a cache (i.e., how full a cache is or, rather, how much is in the cache).

The fill level of the cache can be measured according to one or more fill metrics (i.e., one or more metrics can be used to compute the fill level of the cache). For example, a fill level can be calculated based on a fill metric corresponding to an overall amount of memory consumed by a cache. As another example, a fill level can be calculated based on a fill metric corresponding to an overall amount of entities in a cache. For multiple fill metrics, measurements corresponding to the fill metrics can represent the fill level. Each fill metric has an associated threshold and any combination of the thresholds can be used to determine that a threshold for a fill level of a cache has been reached. For example, in one implementation, a threshold for the fill level of the cache can be reached only if measurements corresponding to each of two metrics both exceed an associated threshold (i.e., measurements for both fill metrics are greater than their respective thresholds). In another implementation, a threshold for the fill level of the cache can be reached if either of two measurements corresponding to each of two metrics exceeds an associated threshold (i.e., measurements for only one of the fill metrics need be above a respective threshold). In that example, two fill metrics can be size of the cache and amount of entities in the cache; measurements for the fill metrics can be 30 megabytes and 1020 entities, respectively; thresholds associated with the fill metrics can be 50 megabytes and 1000 entities, respectively. Because the threshold for the cache is reached when either fill metric reaches an associated threshold, the threshold for the cache would be reached because a measurement for the amount of entities (i.e., a fill metric) has exceeded the associated threshold (i.e., the threshold for the amount of entities being 1000, and 1020 entities being greater than 1000 entities).

Based on a fill level of a cache, one or more actions can be performed in a cache system. As described above, processes (i.e., techniques) for evicting cached entities can be implemented such that the processes are activated based on a fill level. For example, if a fill level is above a first threshold, a process of eviction that actively evicts cached entities can be initiated. In a cache that has multiple fill metrics where each metric has a different amount of associated thresholds, suitable techniques can be used to determine a combination of exceeded thresholds to determine whether a threshold of a cache has been reached and which processes should be performed. For example, in one implementation, two fill metrics can be amount of entities in a cache and size of the cache, and the fill metrics can have three and two associated thresholds, respectively. In that implementation, one threshold of the cache can be reached when a first of two thresholds is exceeded for the amount of entities in the cache and a first of two thresholds is exceeded for the size of the cache; and a second threshold of the cache can be exceeded when a second of two thresholds is exceeded for the amount of entities in the cache and the first of two thresholds is exceeded for the size of the cache. When the first threshold of the cache is exceeded, a first process can be performed and when the second threshold of the cache is exceeded, a second, distinct process can be performed. Thus, different combinations of thresholds associated with fill metrics can be used as thresholds for performing different actions.

FIG. 5 includes an example system in which eviction of cached entities can be implemented. The eviction of cached entities can be managed by the shared cache framework manager 530. In some implementations, the shared cache framework manager 530 can evict cached entities in accordance with a policy (i.e., an eviction policy).

A cache system can use plug-ins to implement different eviction policies in a cache system. For example, a cache system can have an eviction plug-in corresponding to an eviction policy that approximates a least recently used policy. By interfacing the plug-in with the cache system (e.g., copying the policy to a file system and setting environment variables for a server that implements the centralized cache framework), the plug-in can be used by the cache system. Because plug-ins can be used (as opposed to, e.g., hard-coding), eviction policies can be detached easily from a cache system and new eviction policies can be implemented easily, with little or not effort. Each plug-in can contain a specification of a different eviction policy.

Different techniques can be used to implement eviction policies as plug-ins. For example, an eviction policy plug-in can include executable instructions (e.g., compiled source code) that represent a process of indicating which cached entity should be evicted. As another example, a plug-in can interface with the shared cache framework 530 and/or the cache entry table 532 via the API 531, such that the plug-in can view cache entries and, based on certain rules and/or calculations, determine which cached entity should be evicted, and cause that entity to be evicted by an API call. A plug-in can act like a black box such that, when called, the plug-in returns an indication of a cached entry that should be evicted. As a black box, the plug-in can be designed to fulfill certain implementation details such that the plug-in properly interfaces with a cache system.

Although FIG. 5 includes a centralized shared cache, implementations of the eviction processes and mechanisms that evict cached entities need not be implemented in such a cache. For example, a non-shared cache can be implemented that determines a fill level of a cache based on multiple fill metrics. As another example, a cache need not be implemented such that multiple fill metrics are used. For example, in one implementation only the size of the cache is used as a fill metric.

FIG. 8 is an illustration corresponding to a cache system in which multiple thresholds are associated with multiple fill metrics. FIG. 8 includes a graph 810 corresponding to a fill metric for an amount of entities in a cache and a graph 820 corresponding to a size of the cache. The graph 810 includes a measured level 811 (i.e., the fill level of the cache according to the metric for an amount of entities) and three thresholds 812, 813, and 814. The measured level 811 can be measured by any suitable technique. One technique, can involve counting a number of cache entries in a cache entry table. Measurements can occur periodically or in response to events. For example, a measurement can be taken after a request to store an entity in the cache, but before the entity is stored in the cache. In a runtime system that includes dead and live entities, such that garbage collection can be required before entities are removed, the measured level 811 can include both dead and live entities, or the measured level 811 can include only live entities.

The graph 810 corresponds to a cache system in which a fill metric for the amount of entities in a cache is associated with three thresholds. When each of those three thresholds is exceeded, a distinct eviction process starts. The processes can overlap, or the processes can be mutually exclusive. For example, if the first threshold 812 is exceeded, a first process can start. Then, if the second threshold 813 is exceeded, a second process can start and that process can run at the same time as the first process. As another example, a first process can start in response to the first threshold being exceeded, then, when the second threshold is exceeded the first process can be halted and a second process can start. If multiple processes are associated with multiple thresholds, one or more processes can overlap or be mutually exclusive.

Until the first threshold is reached, no eviction process is running (however, other processes that can reduce the fill level, such as garbage collection, can run). When the first threshold 812 is exceeded, a background eviction process starts. The background eviction process evicts cached entities in accordance with an eviction policy. One example eviction policy can approximate a least recently used policy. The eviction policy approximates a least recently used policy, as the policy is not guaranteed to evict the least recently used cached entity. The eviction policy can approximate, rather accurately model, a least recently used process because sorting a list of cached entities to accurately determine a least recently used cached entity can be resource consumptive, so sorting might not occur often. Alternatively, any eviction policy can be used.

The background eviction process continues until enough cached entities have been evicted such that measured level 811 is below the first threshold 812. The background eviction process runs in the background. Running in the background can involve the background eviction process only running (e.g., attempting to evict cached entities) when the cache system would otherwise be idle; running when runtime systems that access the cache are idle; running in between accesses to the cache; or at other suitable times such that the background eviction process does not significantly interfere with the performance of the cache system. As a background process, the time consumption for evicting cached entities is not prescribed to a user request.

If the second threshold 813 is exceeded, a second, distinct eviction process starts (i.e., distinct from the first eviction process). The second eviction process actively evicts cached entities in accordance with the eviction policy. When the second process starts, the background process of eviction stops. By stopping background eviction, double eviction can be avoided and resource usage can be optimized. Actively evicting cached entities can involve, for example, continually evicting entities until the fill level drops below the second threshold. In contrast to background eviction, time consumption for evicting cached entities in prescribed to a user request (i.e., the time consumption of a requests to store an entity in the cache includes the amount of time consumed to evict an entity from the cache). The second eviction process runs until the measured fill level 811 goes below the second threshold 813, at which point the first eviction process can start again.

If the measured level 811 is to exceed the third threshold 814, a third process starts in response to that request. The third process denies any request to add an entity to the cache. For example, if an application requests to add an entity, that entity can only be added to the cache as a shared closure that includes 12 entities, the cache has 998 entities, and the third threshold 814 represents 1000 entities, adding that entity would cause the measured level 811 to exceed the third threshold 814 (i.e., 998+12>1000). Thus, the entity is not added to the cache. The third threshold 814 acts as a hard boundary by declining requests to add an entity to the cache. As described above, the technique of determining whether the third threshold is exceeded differs from the technique used to determine whether the other thresholds have been exceeded. The determination as to whether the third threshold 814 has been exceeded is made prospectively, before an entity is added to the cache, whereas the determinations corresponding to the first and second thresholds 812 and 813 are made after an entity is already added to a cache. In alternative implementations the determinations can all be prospective, or there can be any combination.

Multiple thresholds corresponding to multiple processes can be implemented to optimize cache eviction by balancing cache requests and resource usage. Because the first threshold 812 is used to start background eviction, requests to cache entities need not be hindered by the eviction processes in the cache. Thus, user requests are quickly satisfied in lieu of memory resources. When the memory resources are sufficiently consumed (i.e., when the second threshold is exceeded), active eviction starts, which can ensure the cache does not get too large while still enabling entities to be cached. The hard boundary corresponding to the third threshold can ensure that the cache never exceeds usage of memory resources that might be at a critical level.

In contrast to graph 810, the graph 820 includes two thresholds 822 and 823. The first threshold 822 corresponds to a process of background eviction (i.e., the second process described above in reference to the first threshold 812), and the second threshold 823 corresponds to a process of declining requests to store entities in the cache (i.e., the process described above in reference to the third threshold 814). The graph 820 corresponds to a fill metric for the size of cache memory used. Measured level 821 corresponds to the fill level of the cache for that fill metric.

Graph 820 can correspond to a different cache system than the cache system that corresponds to graph 810. Or, the two can correspond to a same cache system. For example, because the first threshold 812 of the graph 810 corresponds to a process for background eviction of cached entities and the first threshold 822 of graph 820 corresponds to a process for background eviction of cached entities, if either threshold (i.e., 812 or 822) (or, alternatively only if both) is exceeded, a process of background eviction of cached entities can start. Although the fill metrics depicted in the graph 810 and the graph 820 have different numbers of thresholds (i.e., three and two, respectively), in alternative implementations two fill metrics can have a same number of thresholds. In those implementations, a combination of the thresholds can similarly be used to determine which processes for evicting cache should start, and when.

Figure 9:
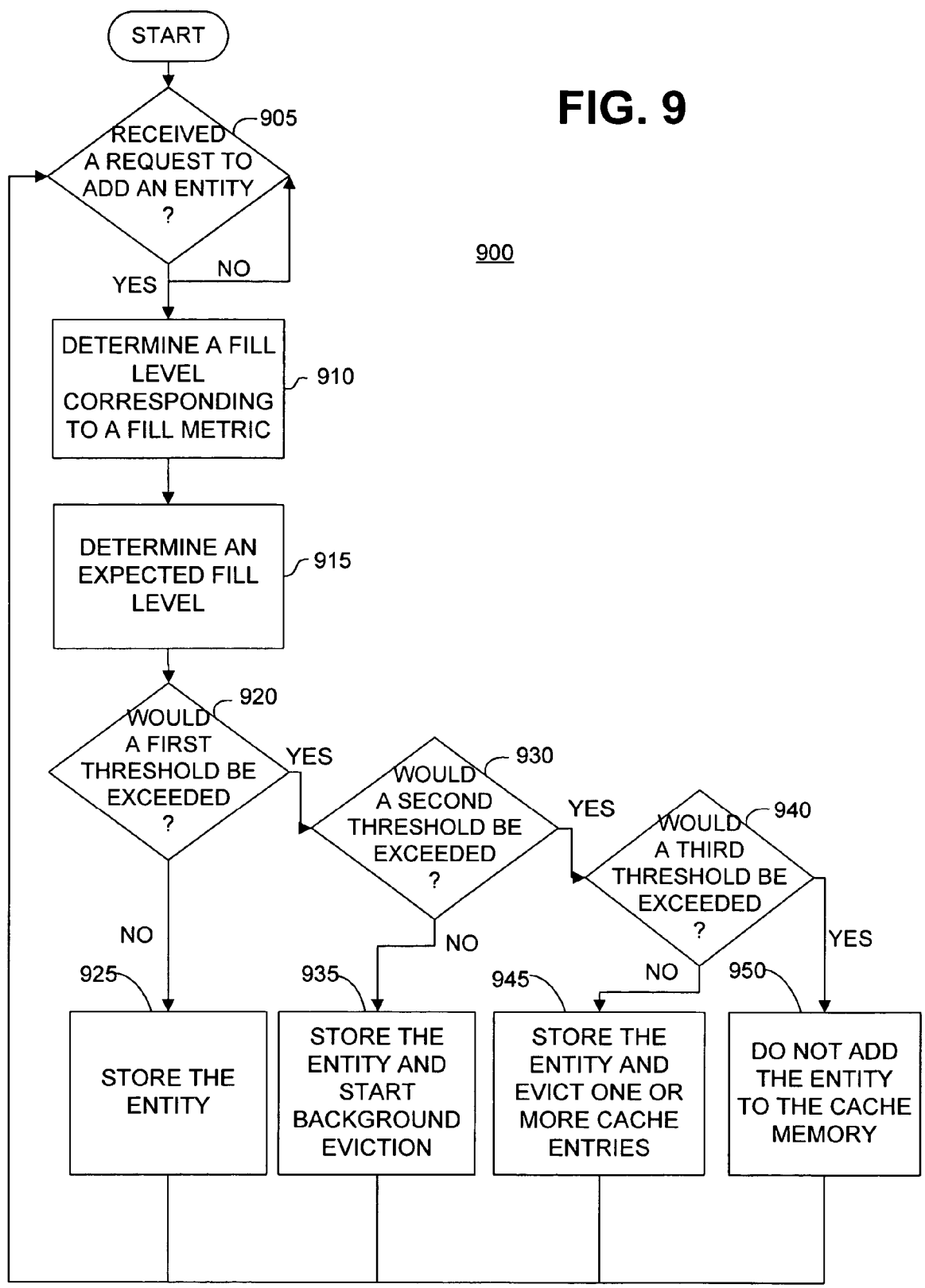
FIG. 9 is a flowchart of a process of evicting cached entries.

FIG. 9 is a flowchart of a process 900 of evicting cached entries. At 905, a determination is made as to whether a request to add an entity to the cache has been received. This request can be received, for example, at a cache framework that manages a cache and cache eviction. If a request has not been received, the determination is repeated (905).

If a request has been received to add an entity to a cache, a determination of a fill level corresponding to a fill metric is made (910). For example, if the fill metric is an amount of entities in the cache, the fill level is a measurement of the amount of entities in the cache and can be determined by referencing a cache entry table. As another example, if the fill metric were a size of the cache, the determination could be made by adding the sum of the size of all the entities in the cache. In one implementation, all objects are added to a cache as a shared closure. In that implementation, there is a function for shared closures such that the size of a shared closure can be readily determined. Thus, the size of a cache can be determined by computing the sum of all of the shared closures in the cache, where the size of each shared closure can be computed by the function (a size for an individual shared closure can be determined, as described above).

At 915, an expected fill level of the cache is determined. The expected fill level is a calculation of how full a cache would be were the entity to be added to the cache. This determination can involve adding the determination from 910 with a determination as to how the entity would affect the fill level of the cache. In a cache system implementing shared closures and a shared cache, if a request is received to add an entity to the cache and the entity could only be shared if a transitive shared closure of entities that includes the entity is stored, the process at 915 can determine the expected fill level to include all entities that would be in the cache if the shared closure were added. For example, if a fill metric is a size of the cache, the size of a shared closure including the entity requested to be added to the cache can be computed and that amount can be added to the amount computed at 910 to determine an expected fill level of the cache.

At 920, a determination is made as to whether the first threshold would be exceeded were the entity to be added to the cache. If not, the entity is stored in the cache (925). In FIG. 8, a first threshold not being exceeded corresponds to the region in graph 810 under the first threshold 812. Storing the entity in the cache can include storing the entity and other entities from a shared closure to which the entity belongs.

If the first threshold would be exceeded, a determination is made as to whether the second threshold would be exceeded were the entity to be added to the cache (930). If that threshold would not be exceeded, the entity is stored in the cache and a background eviction process is started (935). The background eviction process can continue until the fill level corresponding to a fill metric goes below the first threshold. The region of the graph 810 between thresholds 812 and 813 corresponds to the first threshold being exceeded and the second level not being exceeded.

If the second threshold would be exceeded, a determination is made as to whether the third threshold would be exceeded were the entity to be added to the cache (940). If the third threshold would not be exceeded, the entity is stored in the cache and active eviction starts (945). Active eviction removes cached entities until the fill level drops below a threshold. The region of the graph 810 between thresholds 813 and 814 corresponds to the first and second thresholds being exceeded, and the third threshold not being exceeded. That is the region where active eviction would be performed, If the third threshold would be exceeded, the request to add an entity to the cache is declined (950). Declining the request can involve returning a message to an application or raising an exception. Alternatively, a request can be declined by taking no action. After each of the processes at 925, 935, 945, and 950, the process 900 continues at 905.

Although FIG. 9 was generally described with reference to adding a single entity to a cache, FIG. 9 could be modified for adding multiple entities. As an example of a modification, in a cache system implementing shared closures and a shared cache, if a request is received to add an entity to the cache and the entity could not be shared, the request can be denied. Although FIG. 9 was described with respect to a single fill metric, the processes of FIG. 9 can be modified for using two fill metrics. Although FIG. 9 uses a serial process of determining whether a first, second, or third threshold has been exceeded (i.e., a determination for the first threshold, then a determination for the second threshold, then a determination for the third threshold), in alternative implementations other techniques can be used. Although the first, second, and third thresholds of FIG. 9 correspond to processes of background eviction, active eviction, and declining cache requests, respectively, in alternative implementations the processes corresponding to the thresholds can differ. Similarly, the amount of thresholds can vary. For example, one implementation can include four thresholds corresponding to four distinct processes. Although cache eviction was described as having a single policy per an implementation, a combination of policies can be implemented. For example, in one implementation where a fill metric has four associated thresholds corresponding to four distinct processes, a first process could perform background eviction according to an approximated least recently used policy, a second process could perform background eviction in accordance with a least recently used policy (i.e., not approximated), a third process could perform active eviction in accordance with a least recently used policy, and a fourth process can decline requests to store entities in the cache.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the processes of FIGS. 3, 4, 6, 7, and 9 are shown as being composed of a certain number and type of processes, different processes, additional and/or fewer processes can be used instead. For example, in alternative implementations locks might not be implemented. Thus, the process shown in FIG. 7 need not include the processes performed at 760 and 770. Similarly, the processes need not be performed in the order depicted. Thus, although a few implementations have been described in detail above, other modifications are possible. Other implementations may be within the scope of the following claims.

The following is claimed:

1. A machine-readable storage medium comprising instructions which, when executed, cause a machine to:
    evict cached entities of a centralized shared cache memory in accordance with an eviction policy being executed by a framework manager of the cache memory, wherein evicting the cached entities includes versioning the cached entities as they are being referred to by fill metrics, wherein versioning the cached entities includes duplicating the cached entities such that the duplicate cached entities are dynamically updated while the cached entities are being referred to by the fill metrics in compliance with the eviction policy, wherein the cached entities are referred to by the fill metrics that are associated with multiple thresholds that are further associated with multiple distinct processes, and depending on which of the multiple thresholds is exceeded, a corresponding process of the multiple processes is triggered, wherein the instructions which, when executed, further cause the machine to compute a fill level corresponding to a fill metric, the fill level at the cache memory having the cached entities, the computing of the fill level including computing a measurement of each of the fill metrics, wherein the fill level exceeds a threshold if each of the fill metrics exceeds an associated threshold level;
    evict one or more of the cached entities in the cache memory in accordance with a first eviction technique if the fill level exceeds a first threshold but not a second threshold;
    evict one or more of the cached entities in the cache memory in accordance with a second eviction technique if the fill level exceeds the second threshold but not a third threshold; and
    decline subsequent requests to store additional entities in the cache memory if the fill level exceeds the third threshold.

2. The machine-readable storage medium of claim 1, wherein:
    the first eviction technique comprises a background technique that operates independently of requests to store the cached entities in the cache memory; and
    the second eviction technique comprises an active technique that operates in conjunction with the requests to store the cached entities in the cache memory.

3. The machine-readable storage medium of claim 1, wherein the cached entities comprise live cached entities in the cache memory, and marked cached entities in the cache memory that are marked for deletion but whose memory has not yet been reclaimed.

4. The machine-readable storage medium of claim 1, wherein a first fill metric comprises an amount of the cached entities, a second fill metric comprises a total amount of memory being used by the cached entities, and the instructions to compute the fill metrics when executed, cause the machine to:
    count the amount of the cached entities in the cache memory to compute a measurement of the first fill metric; and
    compute the total amount of memory being used by the cached entities in the cache memory to compute a measurement of the second fill metric.

5. The machine-readable storage medium of claim 1, wherein the instructions to evict one or more of the entities in the cache memory when executed, cause the machine to:
    identify one or more cached entities to evict in accordance with the eviction policy.

6. The machine-readable storage medium of claim 5, wherein the eviction policy comprises a least-recently-used policy.

7. The machine-readable storage medium of claim 5, wherein the eviction policy is implemented by a user-specified plug-in module.

8. The machine-readable storage medium of claim 1, wherein the cache memory is shared and commonly accessible by a plurality of runtime systems in a server computer.

9. The machine-readable storage medium of claim 8, wherein the runtime systems comprise virtual machines.

10. The machine-readable storage medium of claim 1, wherein the cached entities in the cache memory are stored in shared closures.

11. The machine-readable storage medium of claim 1, wherein the cached entities in the cache memory comprise objects, and wherein requests to store additional cached entities in the cache memory are generated by user code executing in a virtual machine.

12. The machine-readable storage medium of claim 1, wherein the instructions to compute the fill level of the cache memory when executed, cause the machine to compute a fill level of a cache memory storing shared closures of the cached entities.

13. The machine-readable storage medium of claim 1, wherein the threshold comprises an Nth threshold, wherein the associated threshold level comprises an Nth threshold level associated with the Nth threshold.

14. A method comprising:
    evicting cached entities of a centralized shared cache memory in accordance with an eviction policy being executed by a framework manager of the cache memory, wherein evicting the cached entities includes versioning the cached entities as they are being referred to by fill metrics, wherein versioning the cached entities includes duplicating the cached entities such that the duplicate cached entities are dynamically updated while the cached entities are being referred to by the fill metrics in compliance with the eviction policy, wherein the cached entities are referred to by the fill metrics that are associated with multiple thresholds that are further associated with multiple distinct processes, and depending on which of the multiple thresholds is exceeded, a corresponding process of the multiple processes is triggered, wherein the evicting of the cached entities includes computing a fill level corresponding to a fill metric, the fill level at the cache memory having the cached entities, the computing of the fill level including computing a measurement of each of the fill metrics, wherein the fill level exceeds a threshold if each of the fill metrics exceeds the associated threshold level;

evicting one or more of the entities in the cache memory in accordance with a first eviction technique if the fill level exceeds a first threshold but not a second threshold;

evicting one or more of the entities in the cache memory in accordance with a second eviction technique if the fill level exceeds the second threshold but not a third threshold; and declining subsequent requests to store additional entities in the cache memory if the fill level exceeds the third threshold.

15. The method of claim 14, wherein:

the first eviction technique comprises a background technique that operates independently of requests to store the cached entities in the cache memory; and the second eviction technique comprises an active technique that operates in conjunction with the requests to store the cached entities in the cache memory.

16. The method of claim 14, wherein the cached entities comprise live cached entities in the cache memory, and marked cached entities in the cache memory that are marked for deletion but whose memory has not yet been reclaimed.

17. The method of claim 14, wherein a first fill metric comprises an amount of the cached entities, a second fill metric comprises a total amount of memory being used by the cached entities, the method further comprising:

counting the amount of the cached entities in the cache memory to compute a measurement of the first fill metric; and computing the total amount of memory being used by the cached entities in the cache memory to compute a measurement of the second fill metric.

18. The method of claim 14, wherein the threshold comprises an Nth threshold, wherein the associated threshold level comprises an Nth threshold level associated with the Nth threshold.

19. A system comprising:

means for evicting cached entities of a centralized shared cache memory in accordance with an eviction policy being executed by a framework manager of the cache memory, wherein evicting the cached entities includes versioning the cached entities as they are being referred to by fill metrics, wherein versioning the cached entities includes duplicating the cached entities such that the duplicate cached entities are dynamically updated while the cached entities are being referred to by the fill metrics in compliance with the eviction policy, wherein the cached entities are referred to by the fill metrics that are associated with multiple thresholds that are further associated with multiple distinct processes, and depending on which of the multiple thresholds is exceeded, a corresponding process of the multiple processes is triggered, wherein the server computer system is further to compute a fill level corresponding to a fill metric, the fill level at the cache memory having the cached entities, the computing of the fill level including computing a measurement of each of the fill metrics, wherein the fill level exceeds a threshold if each of the fill metrics exceeds the associated threshold level;

means for evicting one or more of the entities in the cache memory in accordance with a first eviction technique if the fill level exceeds a first threshold but not a second threshold;

means for evicting one or more of the entities in the cache memory in accordance with a second eviction technique if the fill level exceeds the second threshold but not a third threshold; and means for declining subsequent requests to store additional entities in the cache memory if the fill level exceeds the third threshold.

20. The system of claim 19, wherein:

the first eviction technique comprises a background technique that operates independently of requests to store the cached entities in the cache memory; and the second eviction technique comprises an active technique that operates in conjunction with the requests to store the cached entities in the cache memory.

21. The system of claim 19, wherein the cached entities comprise live cached entities in the cache memory, and marked cached entities in the cache memory that are marked for deletion but whose memory has not yet been reclaimed.

22. The system of claim 19, wherein a first fill metric comprises an amount of the cached entities, a second fill metric comprises a total amount of memory being used by the cached entities, the system further comprising:

means for counting the amount of the cached entities in the cache memory to compute a measurement of the first fill metric; and means for computing the total amount of memory being used by the cached entities in the cache memory to compute a measurement of the second fill metric.

23. The system of claim 19, wherein the threshold comprises an Nth threshold, wherein the associated threshold level comprises an Nth threshold level associated with the Nth threshold.

24. The system of claim 19, wherein the virtual machine comprises a Java virtual machine or a Common Language Runtime virtual machine.

* * * * *

UNITED STATES PATENT AND TRADEMARK OFFICE
CERTIFICATE OF CORRECTION

PATENT NO. : 7,590,803 B2  Page 1 of 1
APPLICATION NO. : 10/949541
DATED : September 15, 2009
INVENTOR(S) : Michael Wintergerst It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this

Twenty-first Day of September, 2010

David J. Kappos
*Director of the United States Patent and Trademark Office*